United States Patent
Fang et al.

(10) Patent No.: US 10,172,072 B2
(45) Date of Patent: Jan. 1, 2019

(54) CONNECTIONLESS MODES FOR WIRELESS MACHINE TO MACHINE COMMUNICATIONS IN WIRELESS COMMUNICATION NETWORKS

(75) Inventors: Yonggang Fang, San Diego, CA (US); Xiaowu Zhao, Shenzhen (CN); Ting Lu, Beijing (CN); YuanFang Yu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 438 days.

(21) Appl. No.: 12/807,358

(22) Filed: Sep. 1, 2010

(65) Prior Publication Data
US 2011/0085497 A1    Apr. 14, 2011

Related U.S. Application Data

(60) Provisional application No. 61/244,416, filed on Sep. 21, 2009, provisional application No. 61/241,377, (Continued)

(30) Foreign Application Priority Data

Feb. 26, 2010  (WO) ................ PCT/CN2010/070793

(51) Int. Cl.
*H04W 48/16*   (2009.01)
*H04W 52/10*   (2009.01)
(Continued)

(52) U.S. Cl.
CPC .......... *H04W 48/16* (2013.01); *H04W 52/10* (2013.01); *H04W 52/50* (2013.01);
(Continued)

(58) Field of Classification Search
None
See application file for complete search history.

(56) References Cited

U.S. PATENT DOCUMENTS 5,260,943 A * 11/1993 Comroe et al. ................ 370/332
6,256,321 B1 * 7/2001 Kobayashi .................... 370/464
(Continued)

FOREIGN PATENT DOCUMENTS

KR    10-2006-0049749 A    5/2006
KR    10-2007-0069929 A    7/2007
(Continued)

OTHER PUBLICATIONS

Zhao et al, A Connectionless Approach to Large Scale Sensor Networks, 2004, IEEE Military Communication Conference, All pages.*

(Continued)

*Primary Examiner* — Mohamed A Wasel
*Assistant Examiner* — Tsung Y Wu
(74) *Attorney, Agent, or Firm* — Perkins Coie LLP

(57) ABSTRACT

Techniques, devices, and systems that include mechanisms for connectionless communications in wireless communication networks or systems include using a connectionless reverse link (RL) channel that is identified by a public long code mask. Power for the RL connectionless channel is adjusted by open loop power control under the control or a wireless device or by closed loop power control. The RL connectionless channel supports different transmission rates.

18 Claims, 20 Drawing Sheets

Connectionless Soft/Softer Handoff in RL Cellless Configuration

Related U.S. Application Data filed on Sep. 10, 2009, provisional application No. 61/239,032, filed on Sep. 1, 2009.

(51) Int. Cl.
*H04W 52/50* (2009.01)
*H04W 74/08* (2009.01)
*H04W 52/12* (2009.01)
*H04W 52/14* (2009.01)
*H04W 74/00* (2009.01)

(52) U.S. Cl.
CPC ........ *H04W 74/0833* (2013.01); *H04W 52/12* (2013.01); *H04W 52/146* (2013.01); *H04W 74/002* (2013.01); *H04W 74/0866* (2013.01)

(56) References Cited

U.S. PATENT DOCUMENTS

| | | | |
|---|---|---|---|
| 6,714,528 B1* | 3/2004 | Moon | H04B 7/022 370/335 |
| 6,985,732 B1* | 1/2006 | Ekman | H04W 36/0055 370/338 |
| 7,130,657 B1 | 10/2006 | Sampath et al. | |
| 7,684,523 B2* | 3/2010 | Wang et al. | 375/342 |
| 7,809,012 B2* | 10/2010 | Ruuska et al. | 370/449 |
| 7,847,730 B2* | 12/2010 | Ryba | 342/357.72 |
| 7,898,952 B2* | 3/2011 | Kim et al. | 370/232 |
| 8,189,719 B2* | 5/2012 | Barriac et al. | 375/343 |
| 8,437,769 B1* | 5/2013 | Sarkar et al. | 455/456.1 |
| 2002/0028689 A1* | 3/2002 | Iwami | H04B 7/2662 455/502 |
| 2002/0032760 A1* | 3/2002 | Matthews et al. | 709/223 |
| 2002/0072385 A1 | 6/2002 | Salvarani et al. | |
| 2002/0118665 A1* | 8/2002 | Cleveland | H04W 52/24 370/342 |
| 2002/0140963 A1 | 10/2002 | Otsuka | |
| 2002/0196840 A1* | 12/2002 | Anderson | H04W 52/146 375/130 |
| 2003/0139140 A1 | 7/2003 | Chen et al. | |
| 2003/0186714 A1* | 10/2003 | Vihriala | 455/506 |
| 2004/0001460 A1 | 1/2004 | Bevan et al. | |
| 2004/0192208 A1 | 9/2004 | Kong et al. | |
| 2005/0014470 A1* | 1/2005 | Malladi | H04B 17/336 455/67.13 |
| 2005/0030964 A1 | 2/2005 | Tiedemann, Jr. et al. | |
| 2005/0208959 A1* | 9/2005 | Chen | H04W 4/06 455/515 |
| 2005/0282547 A1 | 12/2005 | Kim et al. | |
| 2006/0013185 A1 | 1/2006 | Seo et al. | |
| 2006/0056354 A1* | 3/2006 | Vasudevan | H04W 72/042 370/332 |
| 2006/0164987 A1* | 7/2006 | Ruiz Floriach | H04L 29/06027 370/235 |
| 2007/0076682 A1* | 4/2007 | Kim et al. | 370/349 |
| 2007/0253372 A1* | 11/2007 | Nakayasu | H04W 36/30 370/331 |
| 2007/0275746 A1 | 11/2007 | Bitran | |
| 2008/0242321 A1 | 10/2008 | Inoue et al. | |
| 2009/0042594 A1* | 2/2009 | Yavuz et al. | 455/522 |
| 2009/0280828 A1* | 11/2009 | Wang et al. | 455/456.1 |
| 2010/0124200 A1* | 5/2010 | Ergen et al. | 370/331 |
| 2011/0190002 A1* | 8/2011 | Hosono | 455/450 |
| 2011/0281581 A1* | 11/2011 | Brandt et al. | 455/427 |
| 2013/0242734 A1 | 9/2013 | Fang et al. | |

FOREIGN PATENT DOCUMENTS

| | | | |
|---|---|---|---|
| WO | 2008/155764 A2 | 12/2008 | |
| WO | WO 2010/063327 A1 * | 6/2010 | ............ H04W 36/08 |

OTHER PUBLICATIONS

IEEE Standard 802.2, Logical Link Control, 1998, IEEE, pp. 1-45.*
Kapoor et al. Bluetooth: Carrying Voice over ACL Links, 2002. IEEE. All Pages.*
3GPP2. CDMA2000 High Rate Packet Data Air Interface Specification. Apr. 2006. 3GPP2. C.S0024-B version 1.0. p. 11-1 to 11-84.*
Wang et al. Access Probe Enhancements. Aug. 25, 2008. U.S. Appl. No. 61/091,718. All pages.*
Wang et al. Access Probe Enhancements. May 12, 2008. U.S. Appl. No. 61/052,583. All pages.*
International Search Report and Written Opinion dated May 30, 2011 for International Application No. PCT/US2010/002422, filed Sep. 1, 2010 (8 pages).
"E-UTRAN—CDMA2000 HRPD Connectivity and Inter-working: Air Interface Specification," 3rd Generation Partnership Project 2 (3GPP2), 3GPP2 No. C.S0087-0 v2.0, Jan. 2010 (409 pages).
"CDMA2000 High Rate Packet Data Air Interface Specification," 3rd Generation Partnership Project 2 (3GPP2), 3GPP2 C.S0024-B, Version 3.0, Sep. 2009 (1,520 pages).

* cited by examiner

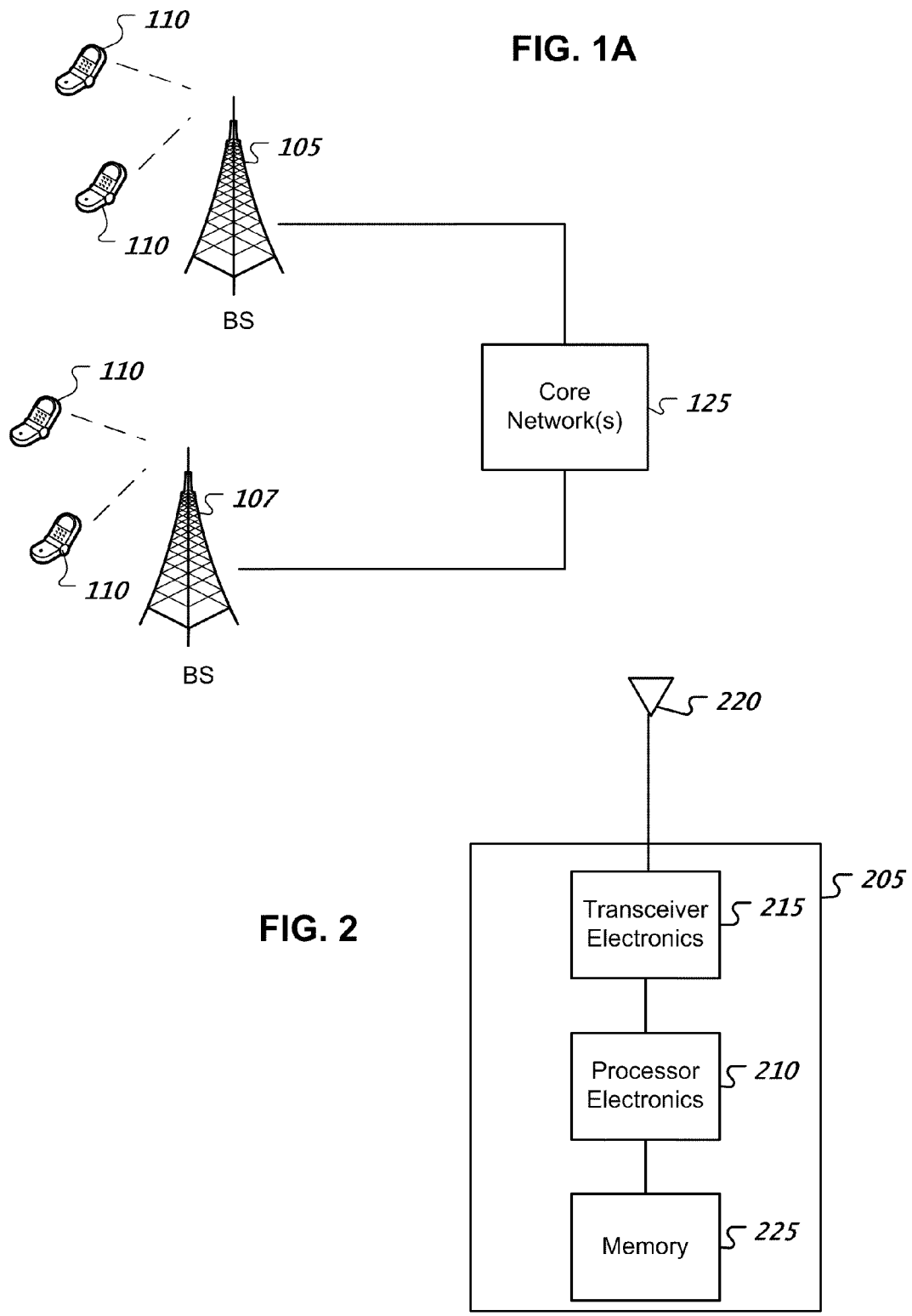

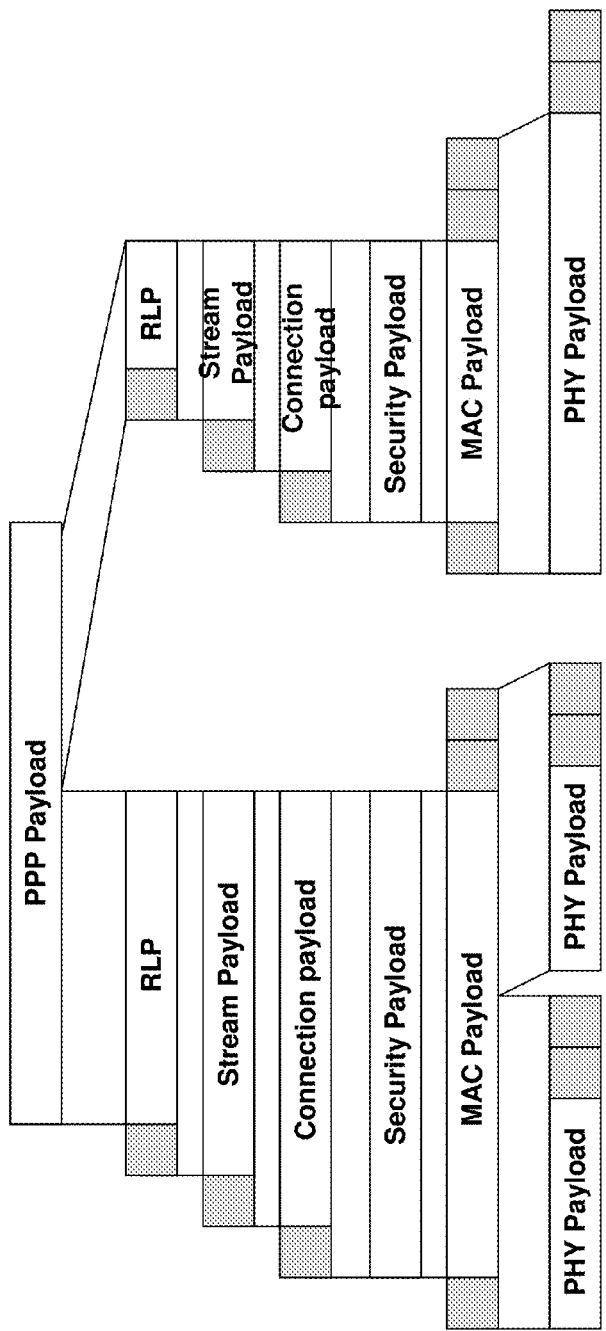
FIG. 6 Connectionless Channel Long Code Mask
FIG. 7 Reverse Link Connectionless Format

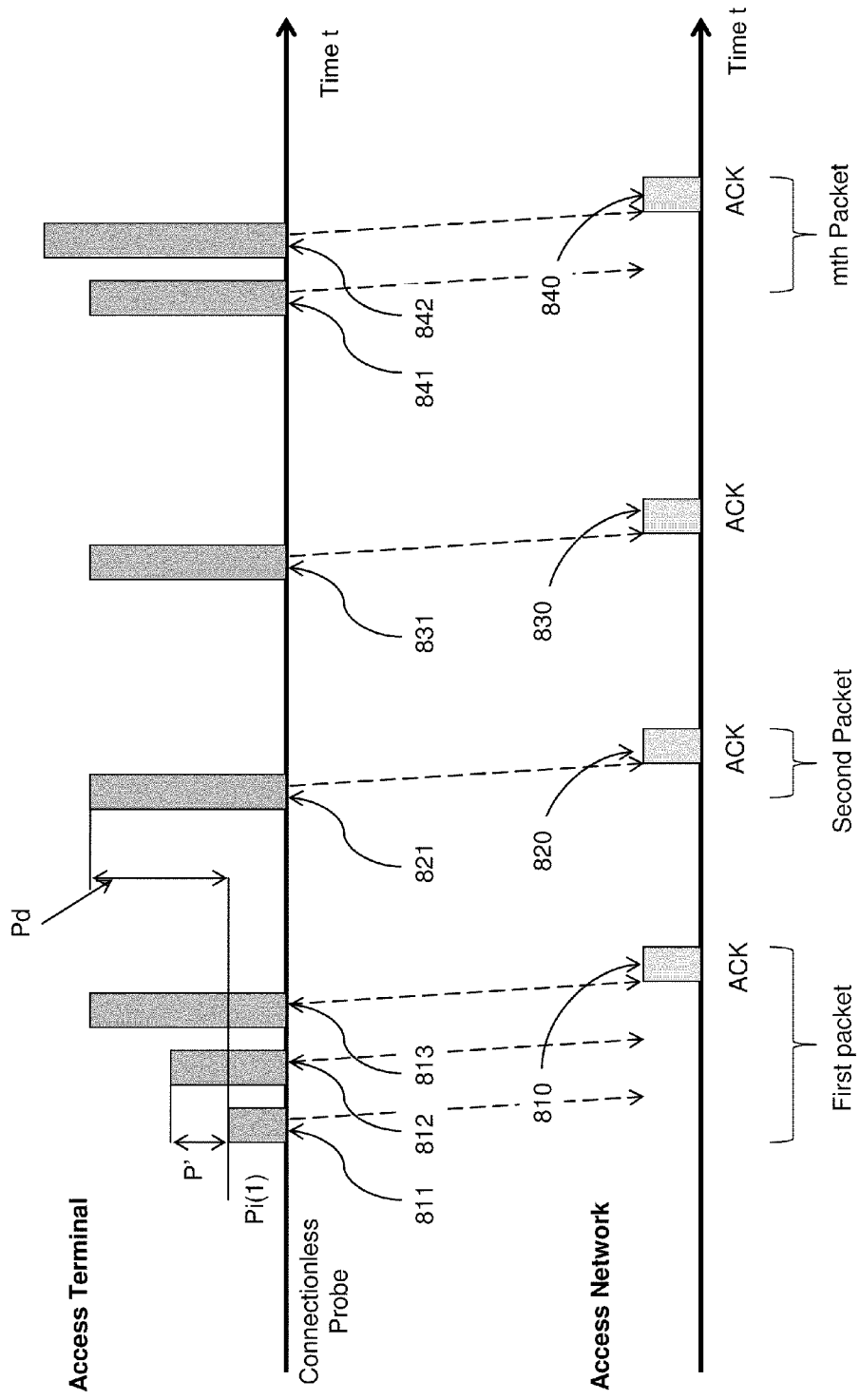
FIG. 8 Reverse Link Connectionless Open Loop Power Control

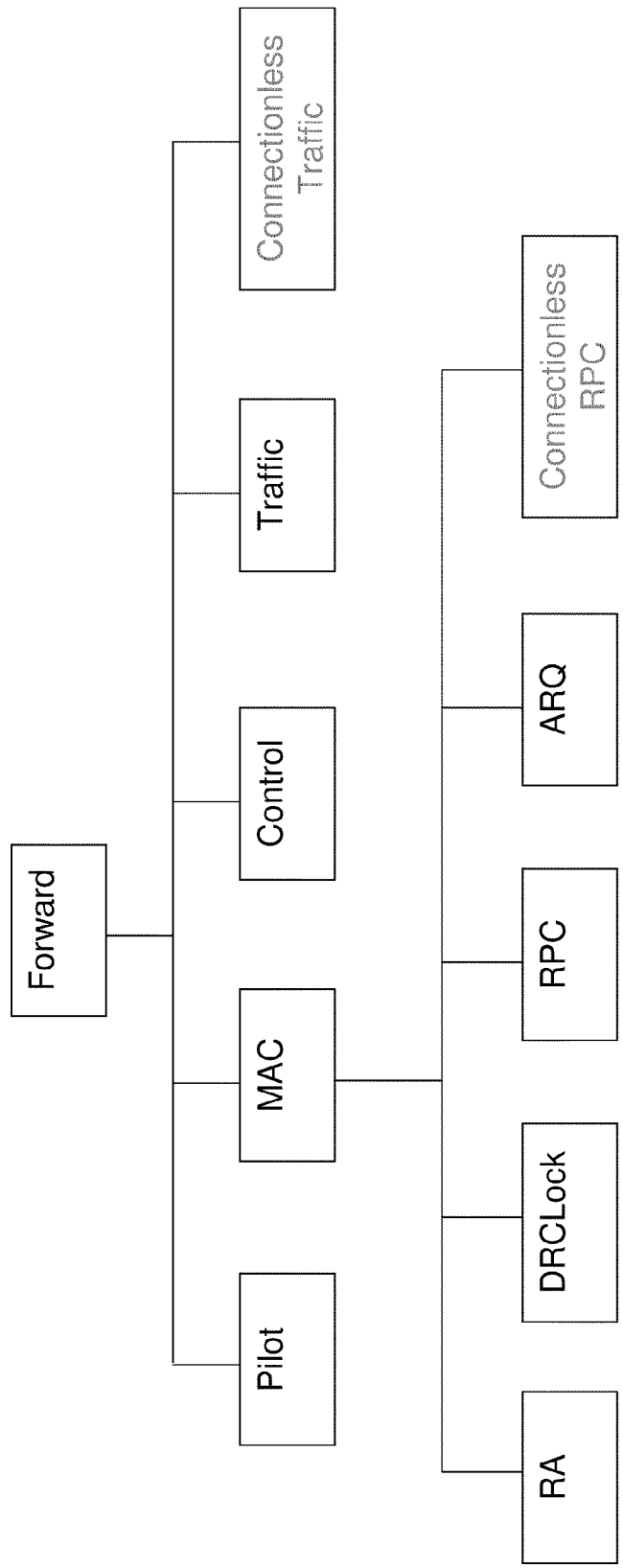
FIG. 9 Forward Link Connectionless Channel Structure

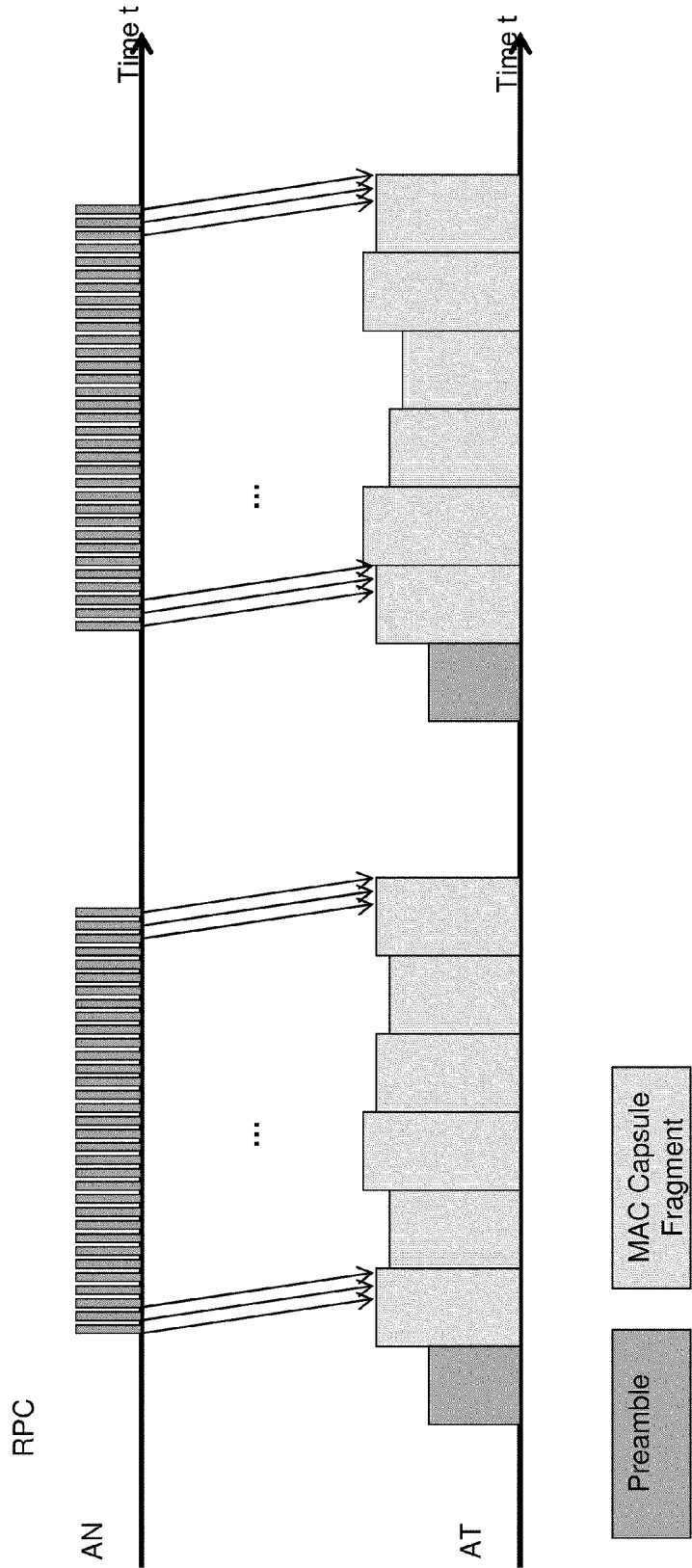
FIG. 10 Reverse Link Connectionless Closed Loop Power Control

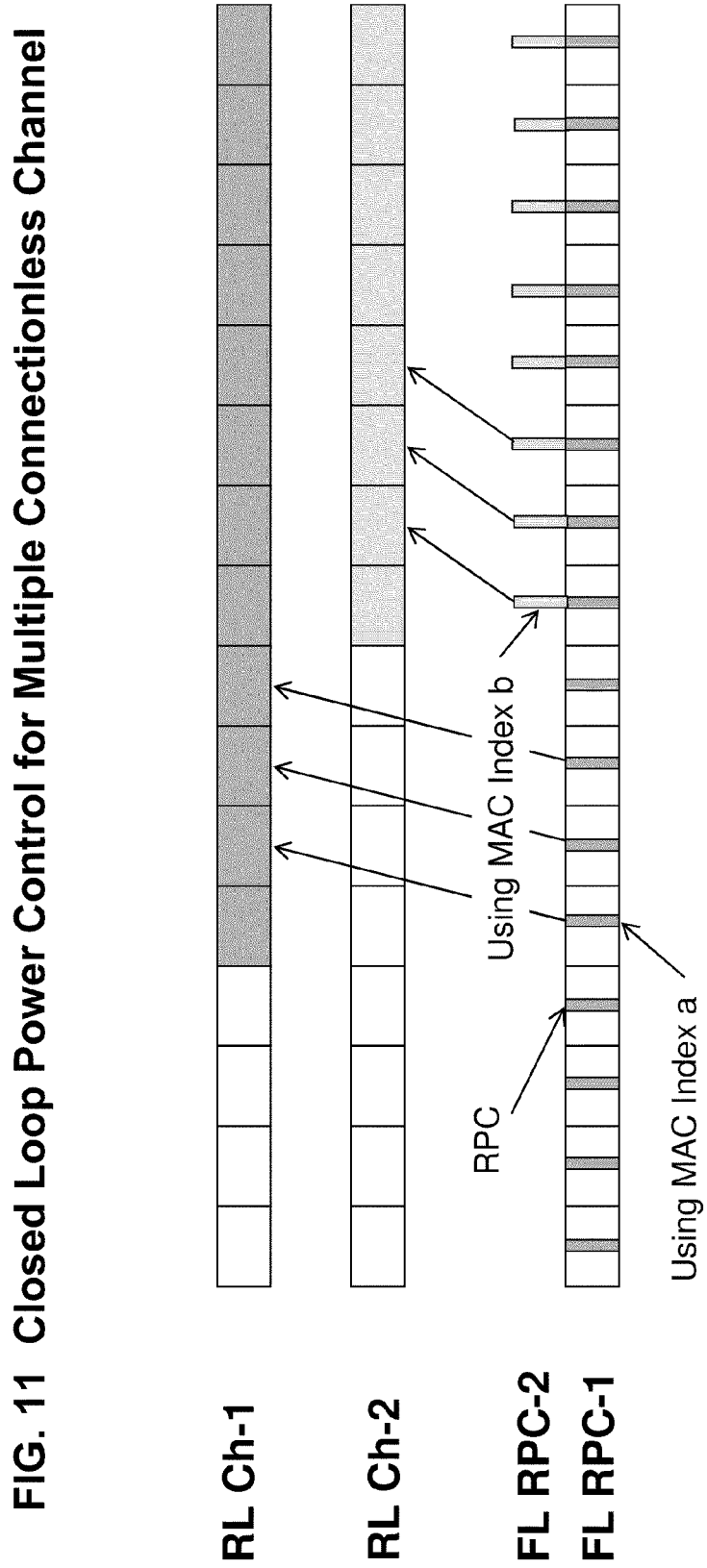
FIG. 11 Closed Loop Power Control for Multiple Connectionless Channel

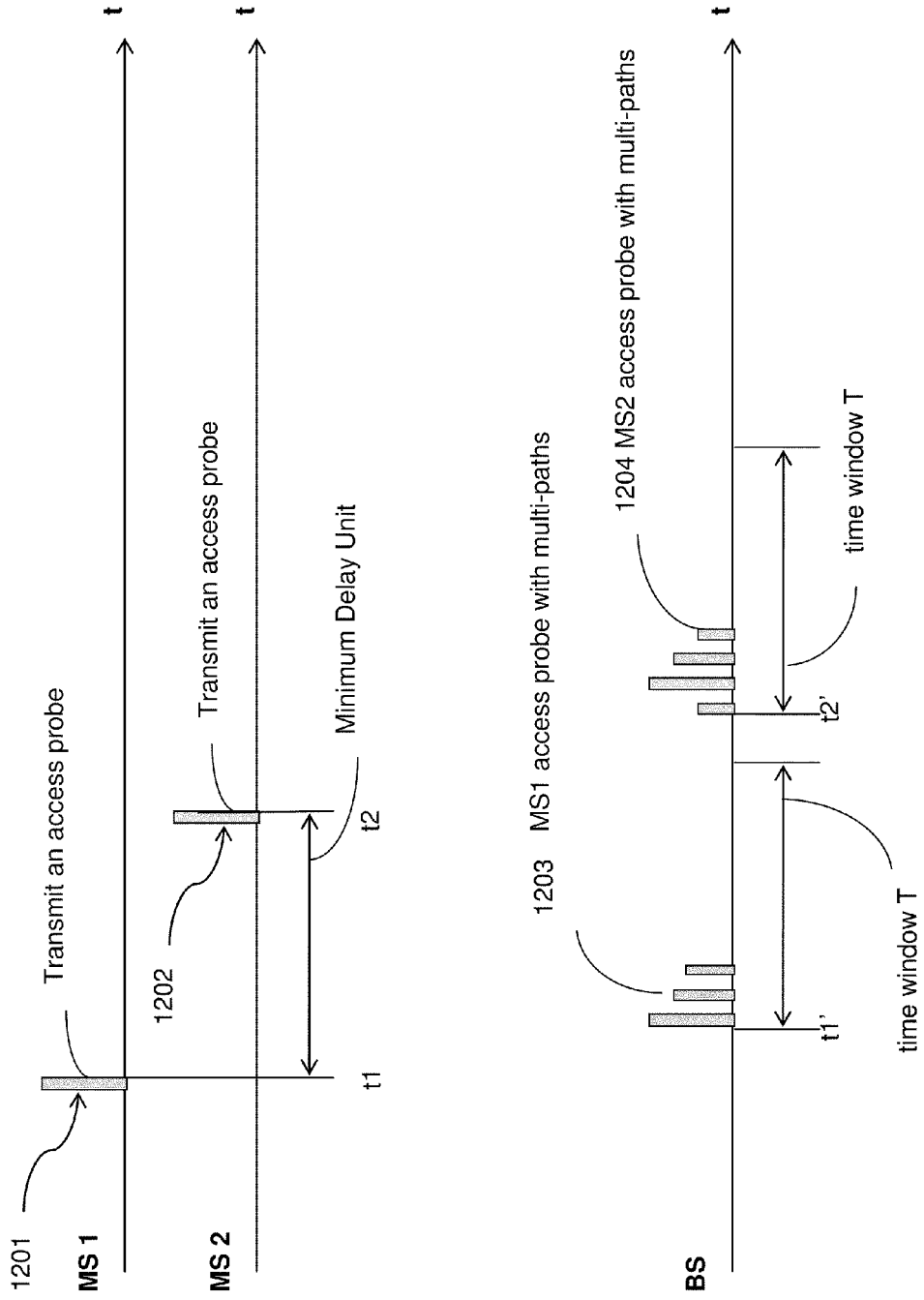
FIG. 12 Combining Multi-Paths of Connectionless Probe

Seamless Soft/Softer Handoff for Connectionless Transmission

Connectionless Soft/Softer Handoff in RL Cellless Configuration

FIG. 15
HRPD Access Connectionless Channel MAC Format for Cellless Configuration: Example 1

| Field | Length (bits) |
|---|---|
| Length | 8 |
| FLServingSectorPN | 9 |
| SessionConfigurationToken | 0 ~ 4 |
| ProbeNumber | 0 ~ 4 |
| ATID | 10 ~ 20 |

FIG. 16
HRPD Access Connectionless Channel MAC Format
for Cellless Configuration: Example 2

| Field | Length (bits) |
|---|---|
| Length | 8 |
| SessionConfigurationToken | 16 |
| SecurityLayerFormat | 1 |
| ConnectionLayerFormat | 1 |
| ProbeNumber | 4 |
| ATID | 34 |
| FLServingSectorPN | 9 |

FIG. 17

Reporting Forward Link Serving Sector: Add Serving Pilot PN Field in LAC

| Field | Length (bits) |
|---|---|
| SERVING_PILOT_PN_PHASE | 15 |

FIG. 18
Reporting Forward Link Serving Sector: Add Serving Pilot PN Field in LAC

| Parameter | Reference |
|---|---|
| Message Type Fields | Section 2.1.1.4.1.1 |
| LAC Length Field | Section 2.1.1.4.1.3 |
| ARQ Fields | Section 2.1.1.2.1 |
| Addressing Fields | Section 2.1.1.3.1 |
| Authentication Fields | Section 2.1.1.1.1 |
| LAC Padding Field | Section 2.1.1.4.1.4 |
| Radio Environment Report Fields | Section 2.1.1.4.1.2 |
| SDU | [5] |
| Serving Pilot PN Field | |
| PDU Padding Field | Section 2.1.1.4.1.5 |

RL Connectionless Channel Data Path

CONNECTIONLESS MODES FOR WIRELESS MACHINE TO MACHINE COMMUNICATIONS IN WIRELESS COMMUNICATION NETWORKS

PRIORITY CLAIM AND RELATED PATENT APPLICATIONS

This patent document claims, under 35 U.S.C. 119(e), the benefits and priorities of the following three U.S. provisional applications filed in U.S.: (1) U.S. Provisional Patent Application No. 61/239,032, filed on Sep. 1, 2009, entitled "Connection and Connectionless Modes for Wireless Communications," (2) U.S. Provisional Patent Application No. 61/241,377, filed on Sep. 10, 2009, entitled "Connection and Connectionless Modes for Wireless Communications," and (3) U.S. Provisional Patent Application No. 61/244,416, filed on Sep. 21, 2009, entitled "Connection and Connectionless Modes for Wireless Communications."

This patent document also claims, under 35 U.S.C. 119 (a), the benefit and priority of International Patent Application No. PCT/CN2010/070793, filed in China on Feb. 26, 2010, entitled "Techniques and Systems for Wireless Machine to Machine Networking."

The entire disclosures of the above referenced applications are incorporated by reference as part of this document.

BACKGROUND

This document relates to wireless communications in wireless communication systems.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry data such as voice data and other data content to wireless devices. A base stations can be referred to as an access point (AP) or access network (AN) or can be included as part of an access network. Further, a wireless communication system can include one or more core networks to control one or more base stations.

A wireless device can use one or more different wireless technologies for communications. Various wireless technologies examples include Code division Multiple Access (CDMA) such as CDMA2000 1×, High Rate Packet Data (HRPD), and Long-Term Evolution (LTE), Worldwide Interoperability for Microwave Access (WiMAX). In some implementations, a wireless communication system can include multiple networks using different wireless technologies.

SUMMARY

This document describes technologies, among other things, for wireless communications between radio stations such as wireless devices and base stations.

In one aspect, techniques for wireless communications can include monitoring a wireless communication channel for an access probe sent from a wireless device; extracting a base station identifier from the access probe, wherein the base station identifier is included in the access probe to identify a base station whose radio signal is received by the wireless device; and operating the base station to transmit an acknowledgement to the wireless device. Other implementations can include corresponding systems, apparatus, and computer programs, configured to perform the actions of the techniques, encoded on computer readable mediums.

These and other implementations can include one or more of the following features. The wireless communication channel can be a reverse link connectionless oriented wireless channel for unscheduled communications from wireless devices. Implementations can include operating wireless devices to transmit access probes based on a randomized value and a minimum delay unit. Implementations can include receiving radio signals via multi-path inference of a radio signal sent by the wireless device, where the radio signal is indicative of the access probe. Implementations can include combining at least a portion of the radio signals based on the minimum delay unit to determine the radio signal sent by the wireless device. Implementations can include assigning a long code mask to a reverse link connectionless oriented wireless channel. Implementations can include operating two or more base stations to monitor for access probes based on the long code mask. Implementations can include operating a monitoring and control network to manage one or more wireless networks. Implementations can include operating the wireless device to transmit data from a network over the reverse link connectionless oriented wireless channel.

In another aspect, techniques for wireless communications can include selecting a base station based on radio signals received from two or more base stations; sending an access probe, over a wireless communication channel, that includes a base station identifier associated with the selected base station, wherein the wireless communication channel is a reverse link connectionless oriented wireless channel for unscheduled communications from wireless devices; and monitoring for an acknowledgment of a reception of the access probe. Sending the access probe can include using a randomized value and a minimum delay unit to determine a time to transmit the access probe. Techniques can include operating a mechanism to interface with a network; and operating a mechanism to send data from the network over a reverse link connectionless oriented wireless channel. Other implementations can include corresponding systems, apparatus, and computer programs, configured to perform the actions of the techniques, encoded on computer readable storage devices.

In another aspect, techniques for wireless communications can include providing a reverse link connectionless oriented wireless channel for unscheduled communications from wireless devices; and operating base stations to communicate with wireless devices. Other implementations can include corresponding systems, apparatus, and computer programs, configured to perform the actions of the techniques, encoded on computer readable storage devices.

In another aspect, systems for wireless communications can include base stations configured to communicate with wireless devices to transmit data over a reverse link connectionless oriented wireless channel allocated for unscheduled communications from wireless devices.

In another aspect, techniques for wireless communications between radio stations can include monitoring multiple wireless channels to receive data from wireless devices and can include transmitting data over one or more forward link wireless channels to one or more wireless devices. Reverse link wireless channels can include a reverse link connection oriented wireless channel associated with scheduled communications from one or more wireless devices and a reverse link connectionless oriented wireless channel associated with unscheduled communications from one or more wireless devices. Forward link wireless channels can include a forward link connection oriented wireless channel associated with scheduled communications to one or more wireless devices and a forward link connectionless oriented wireless channel associated with unscheduled communications to one or more wireless devices. Other implementations can include corresponding systems, apparatus, and computer programs, configured to perform the actions of the techniques, encoded on computer readable mediums such as computer storage devices.

These and other implementations can include one or more of the following features. Implementations can include transmitting power control information on a forward link connectionless oriented wireless channel to control a transmission power output of a wireless device on a reverse link connectionless oriented wireless channel. Implementations can include operating multiple reverse link connectionless oriented wireless channels and operating multiple forward link connectionless oriented wireless channels respectively associated with the multiple reverse link connectionless oriented wireless channels. Implementations can include receiving a signal from a wireless device over a connectionless oriented wireless channel, the signal indicative of a data packet. Implementations can include mobile station and radio network configurations to form a reverse link cell-less transmission so as to make the reverse communication between mobile station and radio networks over the best reverse link and the forward communication over the best forward link These and other aspects, and their implementations and variations are set forth in the drawings, the description and the claims.

BRIEF DESCRIPTION OF THE DRAWINGS

FIG. 1A shows an example of a wireless communication network for serving wireless devices.

FIG. 2 shows an example of a radio transceiver station that can be used to for constructing the wireless devices or base station sin FIGS. 1A and 1B.

FIG. 6 shows an example of a long code mask of the reverse link connectionless channel FIG. 7 shows an example of a reverse link connectionless medium access control (MAC) format.

FIG. 8 shows an example of an open loop power control and retransmission mechanism for the reverse link connectionless channel.

FIG. 9 shows an example of forward link channels including connectionless traffic and power control channels.

FIG. 10 shows an example of a close loop power control mechanism of connectionless channel.

FIG. 11 shows an example of a close loop power control mechanism for multiple connectionless channels.

FIG. 12 shows an example of combining multi-paths of connectionless probes.

FIGS. 15, 16, 17 and 18 show various message formats.

Like reference symbols in the various drawings indicate like elements.

DETAILED DESCRIPTION

Figure 1B:
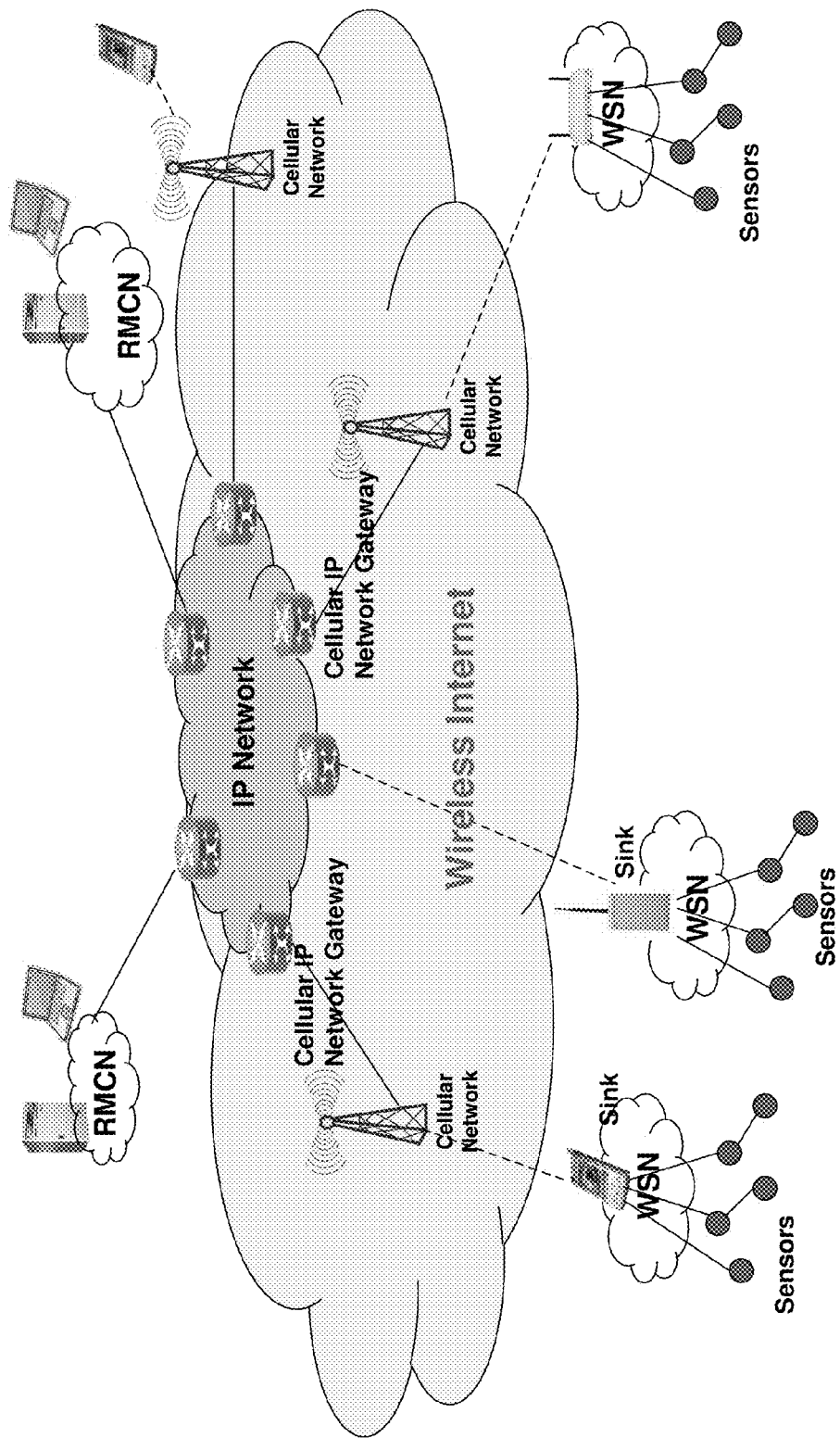
FIG. 1B shows an example of a wireless system with various wireless networks and devices that provide a wireless environment based on the basic network design in FIG. 1A for various communications, including machine to machine communications that can implement connectionless communications.

Various wireless communication systems can use a connection oriented mode for wireless transmissions over an air link interface. For a connection oriented mode transmission, a wireless device first sets up a traffic channel connection with an access network before transmitting user data packets. A connection oriented mode transmission can be used for data streaming applications such as voices, videos, and file transfers to ensure service quality. After a connection is set up, radio stations such as an access terminal (AT) and an access network (AN) can use one or more traffic channels to send packets. In such a connection oriented mode, a wireless device or the radio network cannot send a data packet without the connection. This requirement of setting up the connection takes time and thus it may result in some initial delay in data transmission. Once the connection is setup, the radio resource is dedicated for a particular connection for a wireless device, and remains reserved or occupied for the connection even when the wireless device or the radio network does not have data to send until the connection is released.

In a CDMA2000 HRPD system, for example, the radio network reserves one or more MAC Index for the mobile station for maintaining its live connections to one or more radio networks. When the number of mobile stations in a sector is beyond the maximum number of MAC Index, the radio network has to release one or more mobile stations to the Idle State to solve the radio resource limitation issue. If those mobile stations have more data to transmit, they have to use the access channel to re-establish the connection, which will increase the loading of access channel and cause transmission delay. Similarly in CDMA2000 1x system, when a mobile station requests to establish a connection, the radio network needs to reserve a radio resource including Walsh code channel for the particular mobile station. Due to limited radio resource shared by many mobile stations, it has a possibility that the radio resources are used up by reservation, but the mobile stations are actually not using them to transmit data.

In many connection oriented wireless communication systems, the physical link contains the forward and reverse link common control channels such as reverse link access channel and forward link paging channel in CDMA2000 1x network, or reverse link access channel and forward link control channel in CDMA2000 HRPD network; and one or more dedicated traffic channels. The forward and reverse link common control channels are used to provide a way for the mobile stations to initiate a connection to the radio network, and for the radio network to page the mobile station to establish a connection. The forward and reverse link common control channels normally carry the signaling establishment and releasing of traffic channels. The dedicated traffic channel is assigned by the radio network to a particular mobile station upon receiving connection request. Once the connection is established, the mobile station can use the dedicated traffic channels to communicate with the radio network.

Since the connection oriented transmission requires to establish a connection before the mobile station sends any user packet, it might cause some undesired transmission delay for some data applications such as the push-to-talk, instant data messages and others. In addition, the connection oriented transmission may still occupy radio resource even the mobile station or radio network has no more data to send. This might cause to use up of all the radio resources when many connections for mobile stations are kept alive. Reducing the inactivity timer would help the radio network to force the mobile stations to enter the Idle state and release the some radio resource quickly after mobile station or radio network finish transmission. However, if the mobile station has short burst data to send, it has to re-establish a connection. If the connection is released too soon and too often, it would cause too many signalings between the mobile station and the radio network, which would congest the signaling channel.

For burst type data applications where bursts of data are frequently transmitted, connection oriented mode transmissions can result in delays for short packet transmissions, can result in additional battery consumption, and can consume additional wireless resources such as resources associated with a media access control (MAC) layer. Many applications frequently use bursts of data rather than data streaming. Examples of such applications include various web browsing applications, short messages, instant messaging, e-mails, gaming, machine-to-machine (M2M) communications (e.g., vending machine, monitoring system, meter reading, environment sensing). In some implementations, packet size for a burst is small and transmission is not constant and periodic. Hence, it is not efficient to transmit the burst data via connection oriented mode. Other various data applications such as push-to-talk and gaming applications may require lower latency and the initial delay in establishing the connection in the connection oriented mode can adversely affect the user experience in these and other applications where low latency is desired by users.

This document includes various connectionless mode data transmission mechanisms for wireless communications. Such connectionless mode data transmission mechanisms can provide instant data transmission without first establishing a connection and reserving radio resource for the connection. Such connectionless mode data transmission mechanisms can provide an efficient way for burst data transmission without the initial delay and can separate data from signaling transmission to avoid adding congestion to signaling channels. A radio transceiver station, such as a wireless device or base station, can use both connection and connectionless oriented modes. In some implementations, a radio station can switch between these two modes to transmit or receive data associated with a data application. In some implementations, a wireless communication system using connection and connectionless oriented modes can provide backwards compatibly with wireless equipment that does not support connectionless oriented modes.

Wireless communication systems can provide connectionless channels to increase wireless communication capacity. In some implementations, providing connectionless channels as channels separate from signaling channels can increase signaling capacity. Providing connectionless channels can include providing flexible packet sizes and can include providing flexible transmission rates. Using flexible packet sizes on a connectionless channel can reduce overhead and can increase channel capacity. Using flexible transmit rates on a connectionless channel can reduce overhead and can increase channel capacity.

In some implementations, channel capacity can be expendable through system configuration. For example, a wireless communication system can include multiple connectionless channels. Radio stations can power control a connectionless channel, e.g., open loop power control, closed loop power control. In some implementations, wireless devices using closed loop power control can share a MAC index for connectionless channel transmissions. Base stations can support Mechanism for connectionless channel.

The described connectionless channel mechanisms can provide soft and softer wireless handoffs between base stations. Such mechanisms can provide a seamless transition to a connected state. In some implementations, base stations can perform hierarchical paging. In some implementations, base stations can transmit a multi-use packet over a forward link (FL) connectionless channel. In addition, the connectionless transmission can support seamless soft/softer handoff through the reverse link cellless configurations in a ubiquitous network with multiple virtual cells each centered at a mobile station rather than a base station.

FIG. 1A shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1×, High Rate Packet Data (HRPD), Long-Term Evolution (LTE), Universal Terrestrial Radio Access Network (UTRAN), and Worldwide Interoperability for Microwave Access (WiMAX).

FIG. 1B shows an example of a wireless system with various wireless networks and devices that provide a wireless environment based on the basic network design in FIG. 1A for various communications, including machine to machine communications that can implement connectionless communications. This system includes an IP network and cellular IP network gateways that provide connections to various networks, such as one or more cellular networks, one or more remote monitoring and control networks (RMCNs), one or more wireless sensor networks (WSNs) and others. A remote monitoring and control network is operated to manage one or more wireless sensor networks. One or more wireless devices are operated to transmit data from a sensor network over a reverse link wireless channel, e.g., a reverse link connectionless oriented wireless channel as described herein. This system can be used to support various networking mechanisms for communications, including human to human (H2H) networking such as telephone calls and other person-to-person communications, human to machine (H2M) networking such as various data and other services provided to users via computers and other machines, and machine to machine (M2M) networking for communications between machines to automatically collect, transmit or process information.

The human to human (H2H) telecommunications is based on circuit switch networks and provides voice centric services. The H2H telecommunication networks store information of subscribers for establishing the communication links between end users, and provide switching capability of networking. The human to machine (H2M) communication is based on the packet networks and provides data centric services such as web browsing, file transferring, on-line music, video downloading, etc. The communication network (e.g., the Internet) stores or is connected to a large amount of information for people to access and utilize. The H2M networks provide inter-connection amongst all the information nodes and access capability for people to access the information. In H2M communication, it is human as an edge node to utilize the information stored in the Internet. Therefore the high throughput of downlink, and efficient searching engines are necessary. The Machine to Machine (M2M) communication, on the other hand, provides a way for the automation in the machine world such as home automation, security and alarms systems, smart grid, etc. Wireless M2M communication is built on Wireless Sensor Network (WSN) including RFID. WSN and RFID could send a large amount of information from end machine nodes to the Internet, and store there. In M2M communication, machines in the Internet process and utilize the information collected from end machine nodes. Thus, M2M communications can demand a ubiquitous network with high capacity on the up link for a large number of machine nodes to transmit information to the Internet and sophisticated inter-networking technologies to bring large volume of isolated network nodes together. The connectionless mechanisms described in this document can be implemented to facilitate M2M and other communications in the system in FIG. 1B.

FIG. 2 shows an example of a radio transceiver station for implementing a wireless device, a base station or other wireless communication modules. Various examples of radio stations include base stations and wireless devices in FIGS. 1A and 1B. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1×, HRPD, WiMAX, LTE, and Universal Mobile Telecommunications System (UMTS).

A radio station such as a wireless device or a base station can use one or more connectionless mechanisms to transmit and received unscheduled transmission. In some implementations, a connectionless transmission for a wireless communication system such as one based on CDMA2000 is a communication between radio stations in which a packet can be sent without prior scheduling. A connectionless communication mechanism can include one or more RL connectionless channels and one or more FL connectionless channels. RL connectionless channel, which is identified by the long code mask specified by radio network. The mobile station s in the connectionless state can share the RL connectionless channel for short data burst transmission. The mobile station can send burst data over RL connectionless channel at anytime. The radio network can monitor the RL connectionless channel. FL connectionless channel, which is used for the radio network to send FL burst data to the mobile stations in the connectionless state. In some implementations, a FL connectionless channel can provide a feedback mechanism to control the RL connectionless transmission. A connectionless communication mechanism can include a connectionless channel structure, a RL connectionless transmission, a RL connectionless channel power control, a RL connectionless channel selection, and a RL connectionless channel parameters. A connectionless communication mechanism can include a FL connectionless reverse power control (RPC) channel and a FL connectionless Traffic Channel. A wireless communication system may use an Air Link Management Protocol (ALMP) to control one or more connectionless channels and can operate a connectionless channel based on a connectionless channel configuration information.

Connectionless transmission mechanisms described in this document do not need to setup a connection before transmitting short data burst so that it can provide an efficient transmission for burst type of applications. Such Mechanisms may help wireless communication systems to increase wireless communication capacity. Providing connectionless transmission supports expendable connectionless channel capacity through system configuration. In some implementation, a wireless communication system can include multiple connectionless channels. While in other implementation, a wireless communication system may include one connectionless channel but using different connectionless PN delay to increase the channel capacity.

The connectionless techniques described herein can be used to prioritize the transmission of signals over the user data. In some implementations, providing connectionless transmission mechanism separates the transmission of user data from signaling via physical layer separation. In some implementations, it could use one bit in the MAC header to indicate whether the packet is for signaling or user data. This separation can facilitate prioritizing transmissions between signaling and data, reducing the congestion on the signaling channel and improving the system performance.

The connectionless techniques described herein can also be used to support different transmission rates to adapt different radio environments. Providing connectionless channels can include providing flexible transmission rates and packet sizes. Using flexible transmission rates and packet size of connectionless transmission can reduce overhead and can increase channel capacity. Using the reverse link rate indication can facilitate the base station to demodulate and decode faster and more efficiently.

In some implementations, a radio network can use both connection oriented and connectionless transmission simultaneously and a mobile station can switch between connection oriented and connectionless modes to transmit or receive data associated with a data application. In some implementations, a wireless communication system using connection oriented and connectionless modes can provide backwards compatibly with wireless equipment that does not support connectionless transmission.

A radio station such as a mobile station or a base station can use one or more connectionless mechanisms to perform unscheduled transmission. A connectionless communication mechanism can include one or more RL connectionless channels and one or more FL connectionless channels. A RL connectionless channel is identified by the public long code mask specified by the radio network. The radio network monitors the RL connectionless channel(s). The mobile stations with the connectionless supported can share the RL connectionless channel(s) and transmit short data burst over a RL connectionless channel at anytime. FL connectionless channel, which is used for the radio network to send FL burst data to the mobile stations in the connectionless state. In some implementations, a FL connectionless channel can provide a feedback mechanism to control the RL connectionless transmission.

A connectionless communication mechanism can include a connectionless channel structure, a RL connectionless transmission, a RL connectionless channel power control, a RL connectionless seamless soft/softer handoff, and a RL connectionless channel selection. A connectionless communication mechanism can include a FL connectionless power control channel to provide closed loop power control to the RL connectionless transmission.

A connectionless channel can be a data channel shared by multiple mobile stations in a sector. Therefore the connectionless channel can have similar structure to a common control channels.

Reverse Link Connectionless Channel Structure

Figure 3:
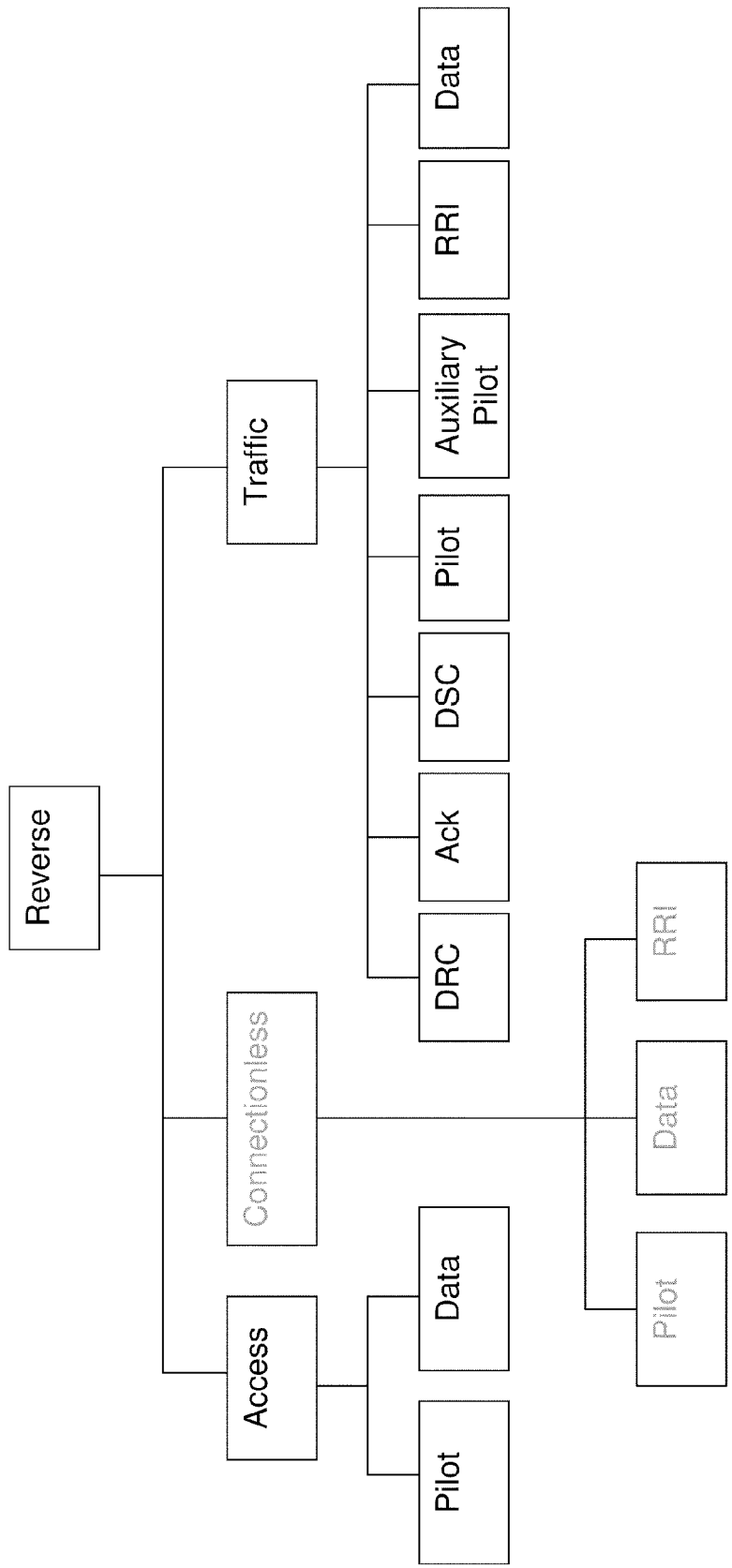
FIG. 3 shows an example of reverse link channels including access, traffic, and connectionless channels, where DRC is data request channel and DSC is data source channel.

FIG. 3 shows an example of a wireless communication's reverse link channels including access, connectionless, and traffic channels. In some implementation, the connectionless channel may share with the access channel to re-use existing channel elements and simplify the implementation.

A reverse link connectionless channel can include a pilot and data channel, which are modulated on different Walsh code channels respectively. The mobile station transmits the pilot for the radio network to acquire the connectionless probe, and assist to demodulate and decode the data packet. The data channel is used for the mobile station to carry the user data. The connectionless data channel can support multiple different transmission rates.

The reverse link connectionless channel may also contain an optional Reverse Rate Indication (RRI) channel. RRI channel is used by the mobile station to indicate the reverse link transmission rate of the data channel. With RRI channel, the radio network could know exactly the data channel transmission rate so as to simplify the demodulation and decoding processing. Otherwise in some implementation, the radio network may use the blind rate detection to demodulate and decode the user data over the data channel.

Reverse Link Connectionless Transmission and Retransmission

A mobile station can use the connectionless transmission mechanism to transmit the short data packet over the reverse link connectionless channel at anytime. The connectionless transmission is divided into transmission probe sequences $\{1, 2, \ldots N_S\}$. This is illustrated in FIG. 4.

Figure 4:
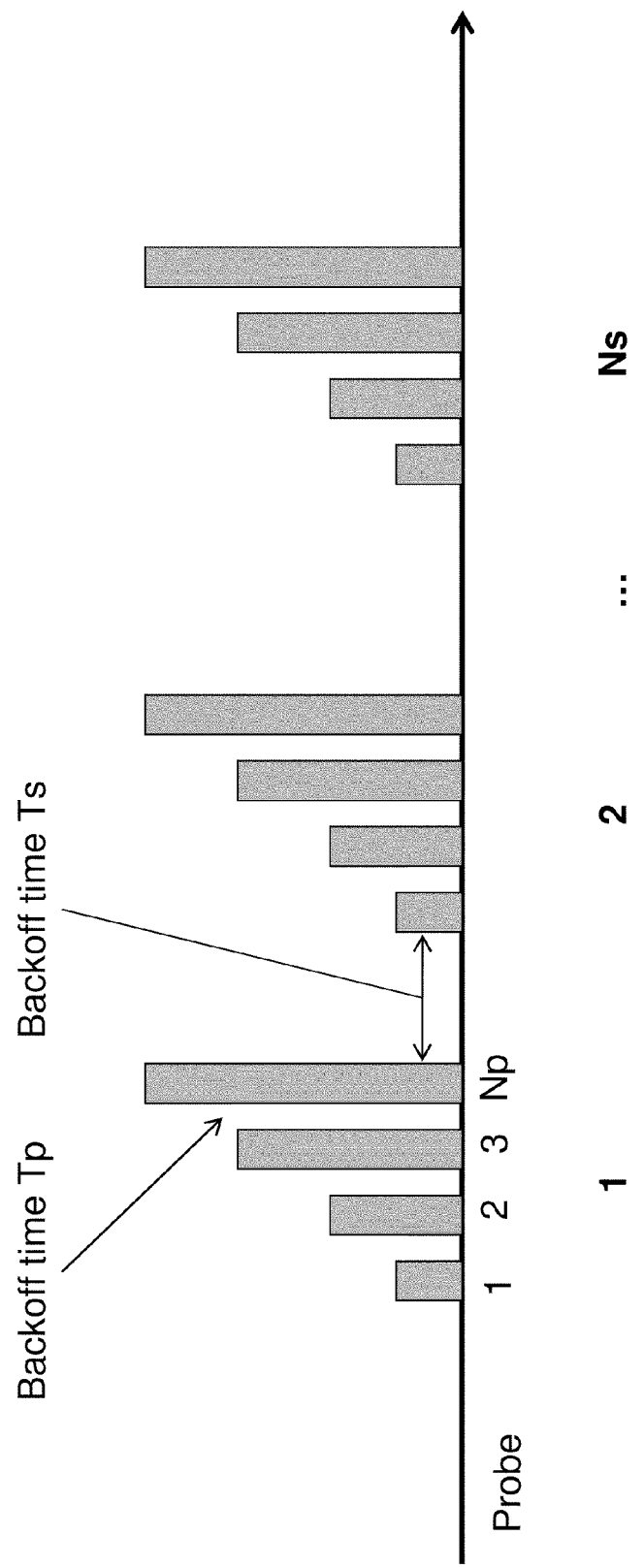
FIG. 4 shows an example of a reverse link connectionless transmission.

In FIG. 4, in each transmission sequence such as 1, the transmission is further divided into $N_p$ probes. The mobile station starts the transmission from Sequence 1, Probe 1 with the initial transmit power. If the mobile station receives the acknowledgement from the radio network, it will stop the transmission of connectionless probe and may prepare for the next short burst data transmission if any. Otherwise, the mobile station will wait for a backoff time $T_p$ to start the retransmission of connectionless probe with increment of initial transmit power. If the mobile station still does not receive the acknowledgement from the radio network after transmitting the $N_p$th connectionless probe, it will wait for the longer backoff time $T_s$ to start retransmitting the connectionless probe at the probe sequence 2. If the mobile station has transmitted the last connectionless probe $N_p$ at the Sequence $N_s$, it will stop further transmission and report the connectionless transmission failure to upper layer protocols.

Figure 5:
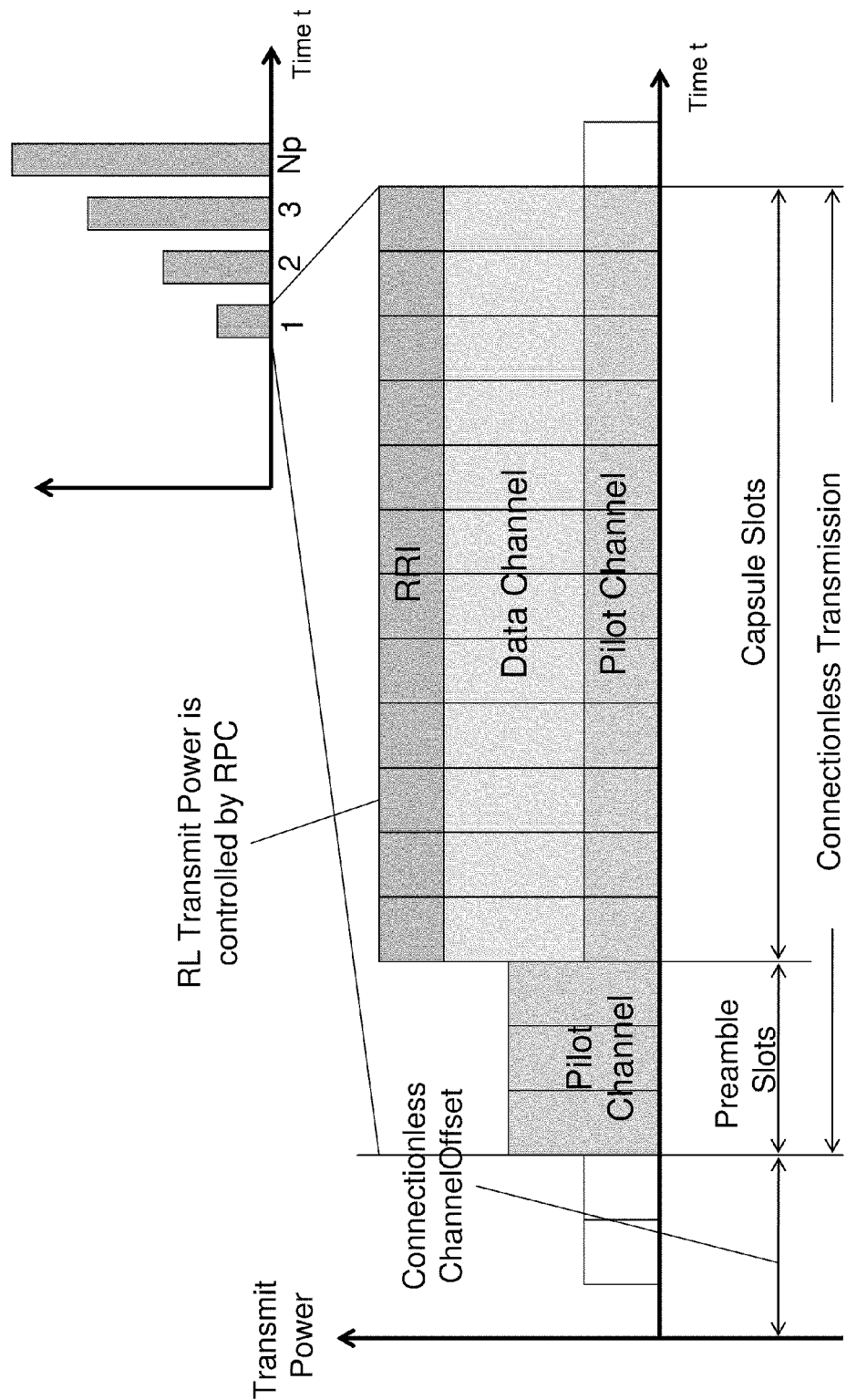
FIG. 5 shows a different example of a reverse link connectionless transmission.

FIG. 5 shows the connectionless transmission probe structure. The mobile station transmits the connectionless probe starting at a particular offset ConnectionlesChannelOffset. Each connectionless transmission probe includes preamble slots and capsule slots. The length of preamble slots and capsule slots are configurable by the radio network.

The mobile station transmits the preamble using constant transmit power level in the preamble slots. The preamble pilot is used to assist the radio network to acquire the connectionless probe.

The mobile station transmits the pilot and packet over the pilot channel and data channel respectively in the capsule slots. The pilot in the capsule slots is used to assist the radio network to estimate the channel condition and decode the packet over the data channel. Once the radio network detects the connectionless preamble, it would demodulate and decode the data channel in the capsule slots using the channel estimation on the pilot in capsule slots.

The connectionless capsule slot could be fitted into one physical frame or could be last in a couple of physical frames. The actual transmitted capsule length depends on the user data packet size. In some application, the capsule slots may be short. In some application, the capsule slots may be cross a couple of physical frames. The maximum capsule slots are configured by the radio network.

In some implementation, the mobile station may transmit the capsule slots with a constant transmit power if the transmission over the connectionless channel is not long. In some implementation, the mobile station may apply the closed loop power control to the transmission in the capsule slots if the transmission over the connectionless channel is longer than a few frames.

Reserve Link Connectionless Physical Channel Identification

In CDMA2000 network, a reverse link channel is identified by a PN sequence. All the PN sequences are generated from a single PN source. Two different PN sequences are of difference phases from the single PN source. Therefore any PN sequence could be generated from the PN source with a public long code mask. The public long code mask is a 42 bits long of binary stream. Each bit of a public long code mask could be set to 0 or 1. If one or two bits are different in the two public long code masks, then the PN sequences generated by those two public long code masks could be considered as completely randomized and independent to each other.

With this characteristic of PN sequence, a public long code mask can be used to identify the reverse link connectionless PHY and MAC channels.

FIG. 6 shows an example of the connectionless long code mask in a HRPD network, The 32 bits of LSB in connectionless long code mask are used to distinguish different sector. Permuted (ColorCode|SectorID[23:0]) is a permutation of the bits in ColorCode|SectorID[23:0] and is defined ColorCode|SectorID[23:0]=($S_{31}$, $S_{30}$, $S_{29}$, . . . , $S_0$)

Permuted(ColorCode|SectorID[23:0])=
($S_0$, $S_{31}$, $S_{22}$, $S_{13}$, $S_4$, $S_{26}$, $S_{17}$, $S_8$, $S_{30}$, $S_{21}$, $S_{12}$, $S_3$, $S_{25}$, $S_{16}$, $S_7$, $S_{29}$, $S_{20}$, $S_{11}$, $S_2$, $S_{24}$, $S_{15}$, $S_6$, $S_{28}$, $S_{19}$, $S_{10}$, $S_1$, $S_{23}$, $S_{14}$, $S_5$, $S_{27}$, $S_{18}$, $S_9$).

The two bits of MSB in connectionless long code mask are set to 1 permanently. The following 8 bits in the connectionless long code mask, is ConnectionlessCycleNumber, which are used to differentiate connectionless channels in PHY.

For each PHY connectionless channel i,

ConnectionlessChannelCycleNumber[i]=(System-Time−ConnectionlessChannelOffset[i])mod 256

Where i is from 1 to NumConnectionlessChannel, and ConnectionlessChannelOffset is the offset for the i Connectionless Channel.

The NumConnectionlessChannel is a parameter defined in MAC layer. The radio network will configure this parameter for the total number of independent connectionless channels in PHY.

If more than one reverse link connectionless channels are configured by the radio network, a mobile station could use the hash algorithm to select one of the reverse link connectionless channels to transmit the connectionless probe. The hash algorithm is used to balance the connectionless transmission loading amongst the connectionless channels and reduce the probability of transmission collision.

The three input parameters to the hash function are

Hash Key=SessionSeed

Decorrelate=0

N=NumConnectionlessChannel

The output of the hash function is the connectionless channel number to be used for the reverser link connectionless transmission.

Alternative approach for identifying the connectionless transmission is to generate a randomized PN delay for each connectionless transmission. In HRPD system, for example, one reverse link connectionless channel is configured. The mobile station uses the hash function to compute the PNRandomizationDelay for the connectionless probe. The input parameters to the hash function are set as follows and the output of the hash function is PNRandomizationDelay.

Key=The 32-bit ATI field in the ATI Record

Decorrelate: ProbeNumber

N=MaxPNRandomizationDelay+ConnectionlessPNDelayExpansion

The mobile station will delay start of the connectionless probe by PNRandomizationDelay×(ConnectionlessPNDelayPNDelayFactor+1)×8 chips.

For example, if MaxPNRandomizationDelay=0, ConnectionlessPNDelayExpansion=8, ConnectionlessPNDelayPNDelayFactor=1, then the hash function will generate a random number between 0-7, which is equivalent to 8 individual connectionless channels in PHY and each of them is separated by 16 chips in time domain.

Both of the above two methods of identifying the reverse link connectionless channel and transmission are based on the same principle of generating an individual PN code for different connectionless transmission. The first method is to let the mobile station to choose one of randomized public long code masks for the connectionless transmission. The second method is to add the PN delay for the connectionless probe transmission so that it is equivalent to create multiple connectionless channels simultaneously. Both methods are independent. In some implementations, either of the methods can be used to identify the connectionless channel for the connectionless transmission. In some implementations, the above two methods can be combined: the mobile station can select one of randomized public long code masks for the connectionless channel and add the randomized PN delay for transmitting connectionless probe over the connectionless channel.

Reverse Link Connectionless Transmission Rate and Packet Length

The reverse link connectionless channel supports various transmit rates {2.4, 4.8, 9.6, 19.2, 38.4, 76.8} kbps. The multiple rate options provide the flexibility for mobile stations to adapt to the radio environment and select the best transmit rate over the the reverse link connectionless channel.

The mobile station may use an optional RRI channel to indicate the transmission rate of the data channel to assist the radio network to demodulate and decode the user data packet. For example, the 3-bits RRI could be used to indicate 8 different transmission rates such as RRI=0 for 2.4 kpbs, 1 for 4.8 kbps, 2 for 9.6 kbps, 3 for 19.2 kbps, 4 for 38.4 kbps and 5 for 76.8 kpbs. Other values of RRI could be reserved for future use.

The connectionless transmission may use the adaptive RRI transmission to reduce the reverse link overhead and reduce the receiver complexity of radio network. For the adaptive data rate indication mechanism, the mobile station can determine the reverse link transmit rate based on its knowledge about reverse link channel condition. The mobile station can either use an explicit rate indication (RRI) to indicate the data rate of the packet being transmitted over the data channel or use an implicit rate indication. In some implementation, the mobile station may not send a RRI (i.e. using an implicit rate indication) if it detects the current transmission rate is same as previous one.

To support the adaptive data rate indication mechanism, the radio network constantly monitors the reverse link connectionless channel(s). If it receives a preamble over a connectionless channel, it demodulates and decodes the received the reverse link packets on the data channel. If the radio network receives RRI, it uses the data rate specified by RRI to decode the reverse link packet on the data channel. Otherwise the radio network may rely on the blind rate detection to determine the transmission rate used by the mobile station.

The radio network can always use the blind rate detection mechanism to determine the transmission rate over the reverse link connectionless channel.

The reverse link connectionless channel supports variable packet lengths. A small size payload could be fitted into one physical frame, while a large size of payload might need a couple of physical frames. The maximum length of connectionless (access) packet is determined by radio network in the connectionless (access) parameters.

FIG. 7 shows an example for a connectionless MAC layer format. The upper layer packet (security) packet is fed into the connectionless MAC layer as a MAC payload. The MAC layer adds the MAC header, CRC and tail. If the total size of MAC packet can be fitted into a PHY format, then the connectionless transmission only needs one PHY frame to carry the payload. If the total size of MAC packet is larger than one PHY frame size, it requires more PHY frames to carry the MAC packet. MAC layer needs to perform disassembling and assembling on the packet.

Reverse Link Connectionless Transmission Power Control

The reverse link connectionless transmission can use two kinds of power control mechanisms to determine the reverse link transmit power level and reduce the interference to other mobile stations: Open Loop Power Control (OLPC) and Closed Loop Power Control (CLPC).

FIG. 8 shows an example of the reverse link connectionless open loop power control mechanism. This Open Loop Power Control mechanism is used to determine and control the initial transmission power of each connectionless probe. When a mobile station is in the Idle state for a long period, it would not be able to know the receiving condition of the radio network over the reverse link. The only available information to the mobile station is the measurement of pilot signal. Therefore the mobile station has to rely on the open loop power control mechanism to determine the initial transmission power $P_i(n)$ of its initial transmission of connectionless probes.

$$P_i(n) = P_p + P_c + (n-1) \times P'$$

Where $P_p$ is the power strength measurement of pilot on the serving sector.

$P_c$ is the constant transmit power adjustment.

$P'$ is the open loop transmit power increment step.

n is the number of connectionless transmission probe, from 1 to N. N is the maximum number of connectionless probes in one connectionless sequence.

In the first packet transmission, its initial transmit power of 1st connectionless transmission probe 811 is $$P_i(1) = P_p + P_c$$

After the mobile station transmits the first connectionless probe to the radio network, it will wait for the acknowledgement. If it does not receive the acknowledgement message within a given period, the mobile station will re-transmit the first connectionless packet in the 2rd probe 812 with increasing the initial transmission power: $P_i(2) = P_p + P_c + P'$. The mobile station will continue to re-transmit the same connectionless probe with power increment until the connectionless probe is received by the radio network, or reach the maximum transmission number.

If the radio network can successfully decode the Sth connectionless probe 813, it will send the Layer 2 acknowledgement 810 back to the mobile station, such as BSACK message in CDMA2000 1× system or ACACK in CDMA2000 HRPD system. If the mobile station receive the acknowledgement 810 to its Sth connectionless probe 813, it remembers the transmit power difference $P_d$ between the first initial transmit power $P_i(1)$ at 811 and the transmit power $P_i(S)$ at the connectionless probe 813.

$$P_d = P_i(S) - P_i(1)$$

The mobile station remembers $P_d$ for a certain period of time, called memory period. The memory period could be configured by the access network. After this memory period expires, the mobile station will become memoryless about $P_d$, i.e. $P_d = 0$. During this memory period, the mobile station should use $P_d$ to adjust its initial transmit power for next connectionless packet transmission such as at probe 821.

$$P_i(n) = P_p + P_c + (n-1) \times P' + P_d$$

With the connectionless open loop power adjustment, the access network may receive the connectionless probe with proper transmit power successfully at first connectionless probe 821 in the second packet transmission and send the acknowledgement 820. In this way, the number of connectionless retransmission would be reduced.

In the mth packet transmission, the radio environment may change and cause the first connectionless probe 841 not be able to decoded by the radio network successfully. Therefore the mobile station will continue to use the open loop power control mechanism to increase the initial transmit power in the next probe 842. If the radio network would receive the connectionless probe 842 successfully, it would send acknowledgement 840 to the mobile station.

The open loop power control mechanism is fully controlled by the mobile station. Therefore it is completely independent to configure the reverse link connectionless channel from the forward link connectionless channel. Since the open loop power control mechanism does not feedback channel from the forward link connectionless channel, it might be more suitable for the case that there is more concern on forward link radio resource such as available MAC Index in HRPD or Walsh codes in CDMA2000 1× system.

Although the open loop power control is simple and easy to implement, it could not provide accurate power control on each reverse link connectionless transmission probe, especially when the connectionless transmission probe is over more frames.

FIG. 9 shows an example of the forward link connectionless channel structure. The forward link connectionless channel contains connectionless RPC channel and traffic. The connectionless RPC channel has similar function to regular RPC channel, but with some difference.

The regular RPC channel is enabled after the traffic channel is established. Since it is associated with traffic channel, it is dedicated to one mobile station. The radio network will transmit the power control command over regular RPC channel. The connectionless RPC channel is associated with the reverse link connectionless channel and shared by mobile stations. Only after detecting the preamble, the radio network will enable the transmission of the connectionless RPC. Once a reverse link connectionless transmission completes, the radio network will stop the transmission on its associated connectionless RPC channel.

FIG. 10 shows an example of the close loop power control mechanism on reverse link connectionless channel. The Reverse Power Control (RPC) channel is defined in the forward link connectionless control channel and used to control the transmission power on the reverse link connectionless transmission.

The mobile station uses the open loop power control mechanism to determine its initial transmission power of each reverse link connectionless transmission probe. After transmitting a connectionless preamble, the closed loop power control may take effective to control the transmission on every slot in the probe.

The radio network transmits a power control command according to the measurement of receiving signal to interference and noise ratio (SINR) of pilot. For each reverse link connectionless transmission cycle, the radio network will compare the Eb/Nt with corresponding setting point to determine RPC bit value. The radio network can adjust the setting point based on outer loop power control. The radio network transmit "1" or "0" to request decreasing or increasing the reverse link transmit power over the connectionless channel respectively. If the radio network does not receive connectionless preamble, it will consider the slots as non reverse link connectionless transmission period, and may not send any RPC bit.

During the capsule slots of connectionless transmission, the mobile station monitors the connectionless RPC channel and adjust its transmit power accordingly. If the mobile station receives power control bits=0, the mobile station increases its transmit power of the connectionless transmission. Otherwise, the mobile station reduces its transmit power.

FIG. 11 shows the two simultaneous connectionless transmissions with close loop power control. There are two reveres link connectionless channels, RL CH-1 and CH-2 are configured for mobile stations to transmit reverse link connectionless probes. Those two reverse link connectionless channels are associated with two power control channel of forward link connectionless channels FL RPC-1 and RPC-2. Those two RPCs would provide individual power control information to the reverse link connectionless channels respectively.

At beginning, there is no connectionless probe being sent by mobile stations. Therefore the radio network would not detect any preamble over either RL CH-1 or CH2 and would not transmit any power control commands over the RPC channels. Once a mobile station starts to transmit probes, there will be radio signaling over the connectionless channel. After detecting the preamble of connectionless probe over RL CH-1, the radio network starts the transmission over FL RPC-1. If radio network detects another connectionless preamble of RL CH-2, it will enable the transmission of power control command over FL RPC-2.

A reverse link connectionless transmission can be associated with one or more forward link connectionless RPC channels to support close loop power control. In some cases, a reverse link connectionless transmission can be associated up to 7 forward link connectionless RPC channels.

The connectionless RPC channel could be also used to indicate the activity over the associated reverse link connectionless channels (or slots). The mobile stations may use the activity information to choose a less loading connectionless channel (slot) to transmit the connectionless probes.

Combining Multi-Paths of Connectionless Transmission

In various wireless communication systems, the random access from mobile stations would create the interference to other users, especially in CDMA system. An access probe from one mobile station would become noise or interference to transmissions from other mobile stations. Due to the radio environment, one access probe could generate multi-path signals at the radio network. Therefore if the radio network could combine possible signal paths of access probe, it would reduce the required the transmission power or retransmission from the mobile station and in turn to reduce interference to others.

In order to be able to combine multi-paths of access signal over the connectionless channel from a mobile station, the radio network could use the PN randomization delay mechanism.

The minimum delay unit (8 chips×PNDelayFactor) is used to separate the simultaneous transmissions from different mobile stations. This delay value will also be used to form a time window T for radio network to decide the combination of multi-paths of access (or connectionless) signal from a mobile station. The radio network should consider signal paths received within the time window T as multi-paths from a single mobile station and should combine them. The radio network should treat the signals received beyond the time window T as from different mobiles and should not combine them in the base band.

FIG. 12 shows an example of the combination of multi-paths from a connectionless probe.

A mobile station MS1 transmits a connectionless probe 1201 at time t1. Another mobile station MS2 transmits a connectionless probe 1202 at time t2. The time difference between t1 and t2 is a multiple of the minimum delay unit (8 chips×PNDelayFactor). The minimum delay unit is determined by the cell radius and increases with the cell radius.

When the radio network receives the connectionless probe 1201 from mobile station MS1 at t1', it may see multi-path 1203 of the connectionless probe 1201. Similarly, the radio station would receive the connectionless probe 1202 from MS2 at t2' with its multi-paths 1204. Since the minimum delay unit (time window T) is chosen to make the multi-paths from a single mobile station fall into T, therefore the radio network should combine the signal paths from the earliest receipt of the connectionless signal at the time t1' till the time t1'+T. Similarly it combines the signal paths from the t2' to t2'+T.

The minimum delay unit is chosen large enough for the radio station to be able to separate the multi-paths of one connectionless probe from other mobile stations' transmissions.

Reverse Link Connectionless Soft/Softer Handoff and Cellless Configuration

The connectionless transmission can support seamless soft/softer handoff through the reverse link cellless configurations. The reverse link cellless configuration is used to form a ubiquitous network with multiple virtual cells centered at each mobile station via provisioning the adjacent cells with same public long code mask for the reverse link connectionless channel.

Figure 13:
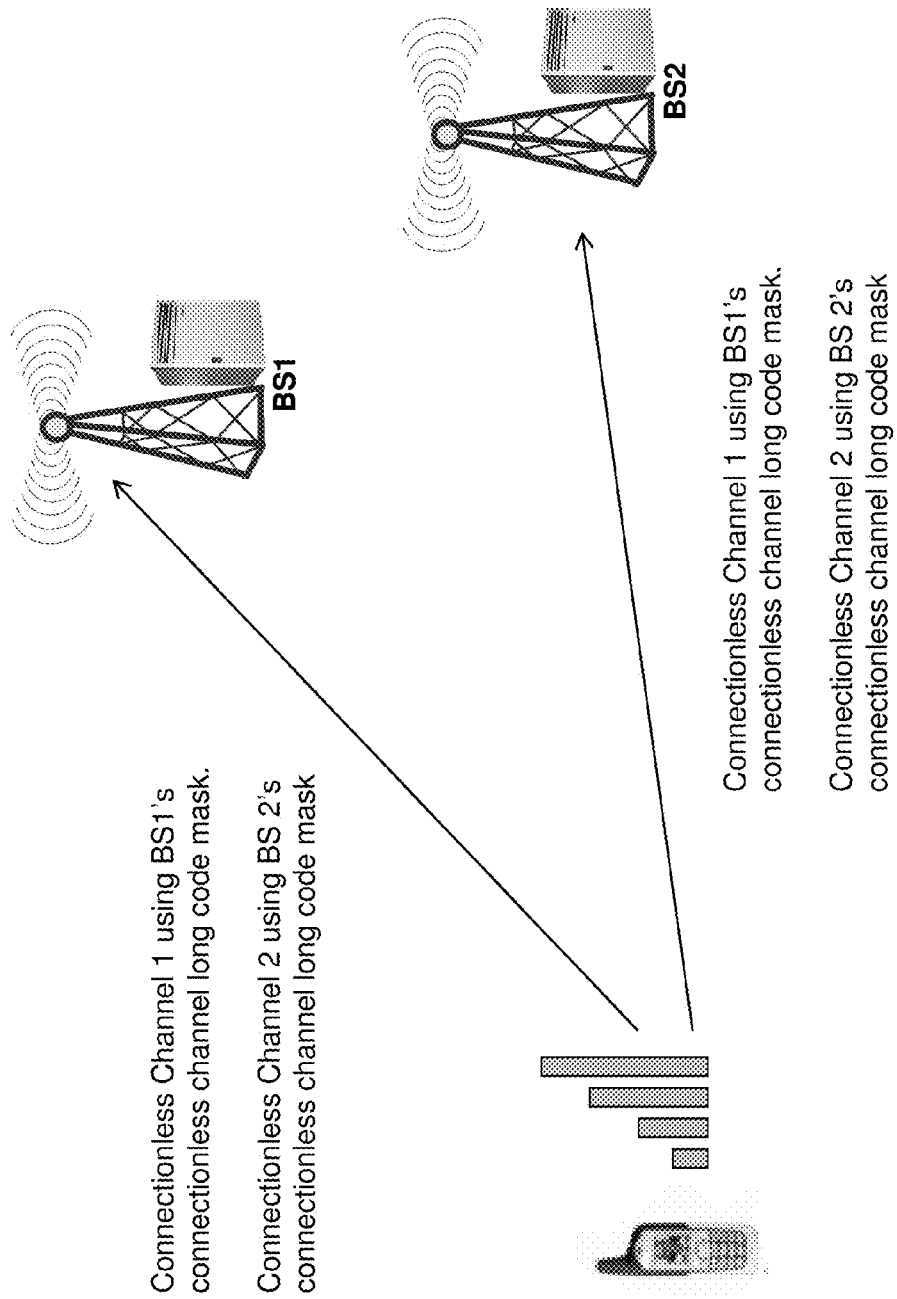
FIG. 13 shows an example of seamless soft/softer handoff for connectionless transmission

As shown in FIG. 13, the radio network 1 is a neighbor of radio network 2. The two neighbor radio networks (e.g. BS1 and BS2) are configured to have two reverse link connectionless channels.

In FIG. 13, the first reverse link connectionless channel is configured to use its own public long code mask to receive the reverse link connectionless probes from the mobile stations in its cell or sector. The second reverse link connectionless channel is configured to use its neighbor cell's public long code mask to receive the connectionless probes from the mobile stations sending to the neighbor cell. When a mobile station in the edge of BS1 and BS2 is transmitting a reverse link connectionless probe, both radio networks, BS1 and BS2 could receive the probe from either the first reverse link connectionless channel or the second connectionless channel. If either radio network BS1 or BS2 receives a connectionless probe from the mobile station, it will send the acknowledgement message back to the mobile station to stop further transmitting connectionless probes. Meanwhile the radio network which receives the connectionless probe successfully will pass the decoded user's packet to the upper layer protocols for further processing.

To further simplify seamless soft/softer combining of connectionless transmission, each radio network could configure a reverse link connectionless channel using the global public long code mask. All the radio networks could be considered to share the same reverse link connectionless channel. Even all the radio networks share the same reverse link connectionless channel, the radio networks could still be able to distinguish the connectionless transmission probe from different mobile stations using the connectionless transmission identification such as connectionless PN Delay mechanism.

Figure 14:
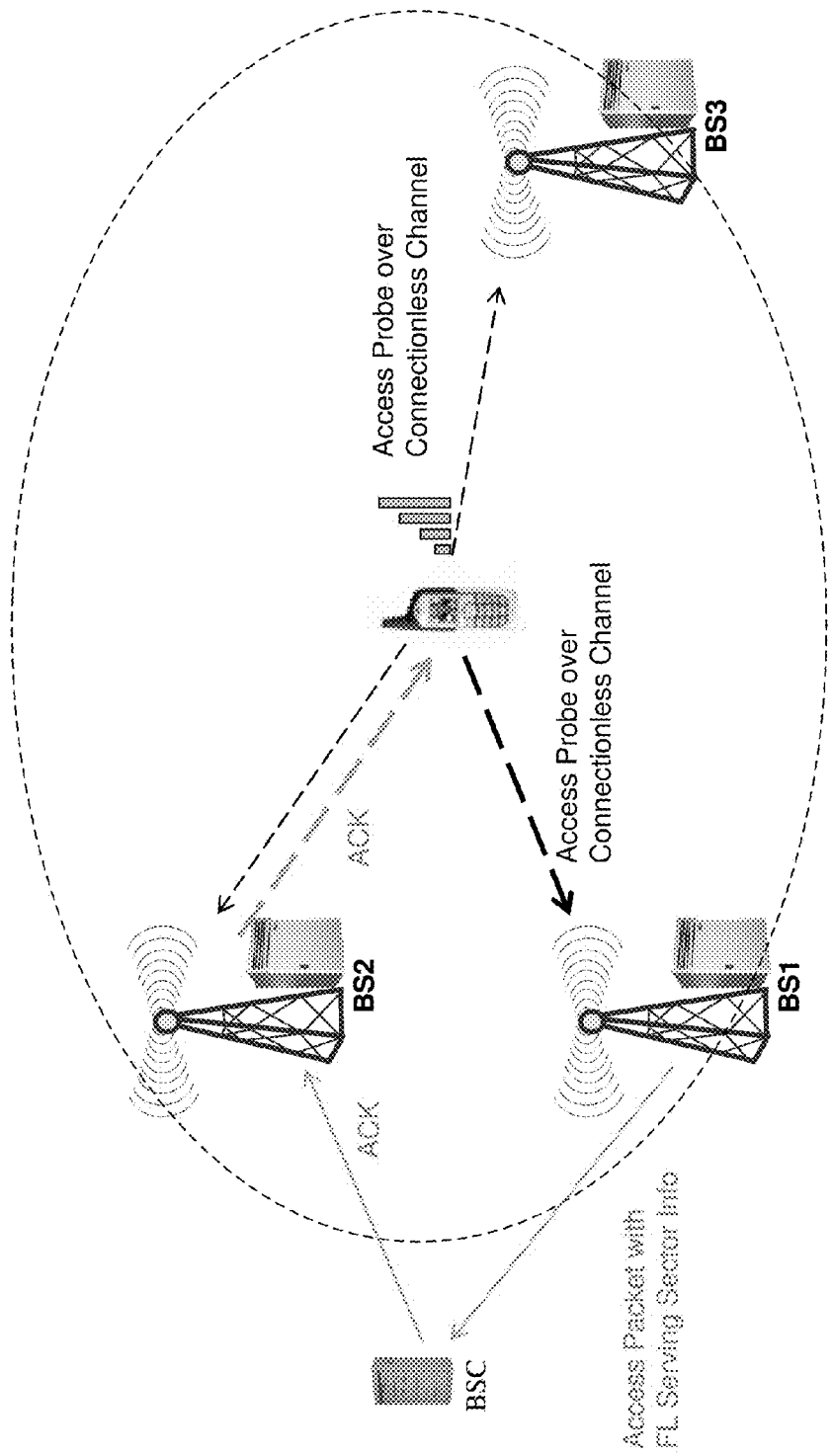
FIG. 14 shows an example of connectionless soft/softer handoff in RL cellless configuration.

FIG. 14 shows an example of using a global public long code mask of connectionless channel to support seamless soft/softer combining. All the radio networks (e.g. BS1, BS2, and BS3) are configured with a reverse link connectionless channel using a global public long code mask. After initialization, all the radio networks continues monitoring the reverse link connectionless channel. Therefore this configuration forms a cellless coverage on the reverse link. When a mobile station is in the coverage of the networks, no matter where it is in a particular cell, the mobile station could transmit anytime a short burst data over the connectionless channel with a connectionless PN delay. The connectionless PN delay generates even distribution of transmission delay in time domain so as to reduce the transmission collision from different mobile stations and increase the connectionless channel capacity. If the mobile station is close to one radio network such as BS1, then the connectionless probe may only be received by the radio network BS1. In another example, if the mobile station is in the forward link coverage overlapped by multiple radio networks such as BS1, BS2, and BS3, the connectionless probe sent from the mobile station may be received by all the radio networks.

If only one BS receives an access probe over connectionless channel, it will forward the packet to the network node such as BSC. If more than one BS receive the same access probe over the reverse link connectionless channels within the time window T, the BSs should perform soft-combining on the received access probes over the connectionless channel if the BSs are from different sectors of the same cell. Otherwise, if BSs are from different cells, the BSs will forward the packet to BSC. BSC then selects the best signal over the reverse link connectionless channels. In other words, the softer and soft handoff on the reverse link connectionless channel would be implicitly implemented in reverse link cellless ubiquitous configuration.

In the existing wireless specification such as 3GPP or 3GPP2, it defines that the mobile station transmits the random access probe over the reverse link on the same cell which it is monitoring on the forward link. The cell which a mobile station is monitoring depends on the pilot signal on forward link of the cell and its neighbor cells. In other word, the existing specification always assumes the best forward link serving cell/sector is the best reverse link serving cell/sector. However in the typical deployment scenario, the forward and reverse link serving cells/sectors are not balanced, i.e. the best forward link serving sector to a mobile station might not be its best reveres link serving sector. This imbalance of forward and reverse links serving sectors might cause the mobile station extra transmit power or re-transmit the unnecessary access probe.

For example: the best reverse link to the mobile station is with BS1, but the best forward link could be with BS2. If the mobile station camped at BS2 according to the pilot measurement, the mobile station may need transmitting the connectionless probe twice before the BS2 receives it. However, the connectionless probe may be received by BS1 at first time. If BS1 would pass the receipt information to BS2 and let BS2 to send ACK to MS, it would avoid transmitting the second connectionless probe.

In order to improve the imbalance between forward link and reverse link serving sectors, it is necessary to separate the best forward and reverse link serving sectors and response transmission mechanism. Since all the radio networks surrounding to the mobile station uses the same public long code mask for the reverse link connectionless channel, it will already guarantee the radio network(s) with the best reverse link will receive the connectionless (access) probe first.

To have the radio network know the best forward link sector in a connectionless probe transmission, the mobile station could include the Forward Link Serving sector (FLSS) information in the connectionless (access) probe message. When the best reverse link serving sector receives the connectionless (access) probe message with FLSS information, it may pass the receipt indication to the serving radio network specified by FLSS (through BSC). The forward link serving radio network will send an ACK to the mobile station.

FIGS. 15 and 16 show an example of CDMA2000 connectionless (or access) channel MAC format. The connectionless (or Access) channel MAC format includes a new 9-bits field of FLServingSectorPN. When the mobile station transmits a data over the reverse link connectionless channel, it will include in the field with the pilot PN code of the serving sector which it is camping on. When a new radio network receives a message over connectionless (or access) channel, it will check the FLServingSectorPN. If FLServingSectorPN is the same as its own pilot PN code, this radio network (BS) will send a connectionless ACK. Otherwise, it may send the connectionless ACK, and will send an indication to the serving sector indicated by the FLServingSectorPN through the backhaul connection. The serving sector then will send a connectionless ACK to the mobile station. When the legacy radio network receives the connectionless (or access) channel MAC PDU, it will ignore FLServingSectorPN field.

FIGS. 17 and 18 show another example of implementing FLSS in CDMA2000 1× LAC format. In CDMA2000 1× LAC, a new 15-bits field of SERVING_PILOT_PN_PHASE is included for indicating the serving cell which the mobile station is camping on. When a mobile station with P_REV_IN_USEs greater than a certain value sends a message or data over r-csch, it will include SERVING_PILOT_PN_PHASE field in LAC PDU. For the legacy mobile station with P_REV_IN_USEs less than a certain value, it will ignore SERVING_PILOT_PN_PHASE field.

If a new radio network receives a message or data over r-csch, it will check the SERVING_PILOT_PN_PHASE field. If the SERVING_PILOT_PN_PHASE is the same as its own pilot PN, it will send a BS ACK. Otherwise, it may send a BS ACK, and will send an indication to the serving base station indicated by SERVING_PILOT_PN_PHASE. The serving base station will then send a BS ACK to the mobile station. The legacy radio network will ignore SERVING_PILOT_PN_PHASE field if received.

When the mobile station receives the ACK from the serving sector, it will disable re-transmission of the current connectionless probe and switch to the next transmission if it has more packets. In this way, it guarantees to have the best reverse link serving sector to receive the connectionless probe and the best forward link serving sector to acknowledge the receipt of connectionless probe.

After successfully receiving the connectionless probe from a mobile station, one or more radio networks will pass the decoded user packet to the upper layer protocols for further processing. If the network node such as BSC receives multiple same packets from different base stations, it could perform the duplication detection and delete the duplicated packet.

Figure 19:
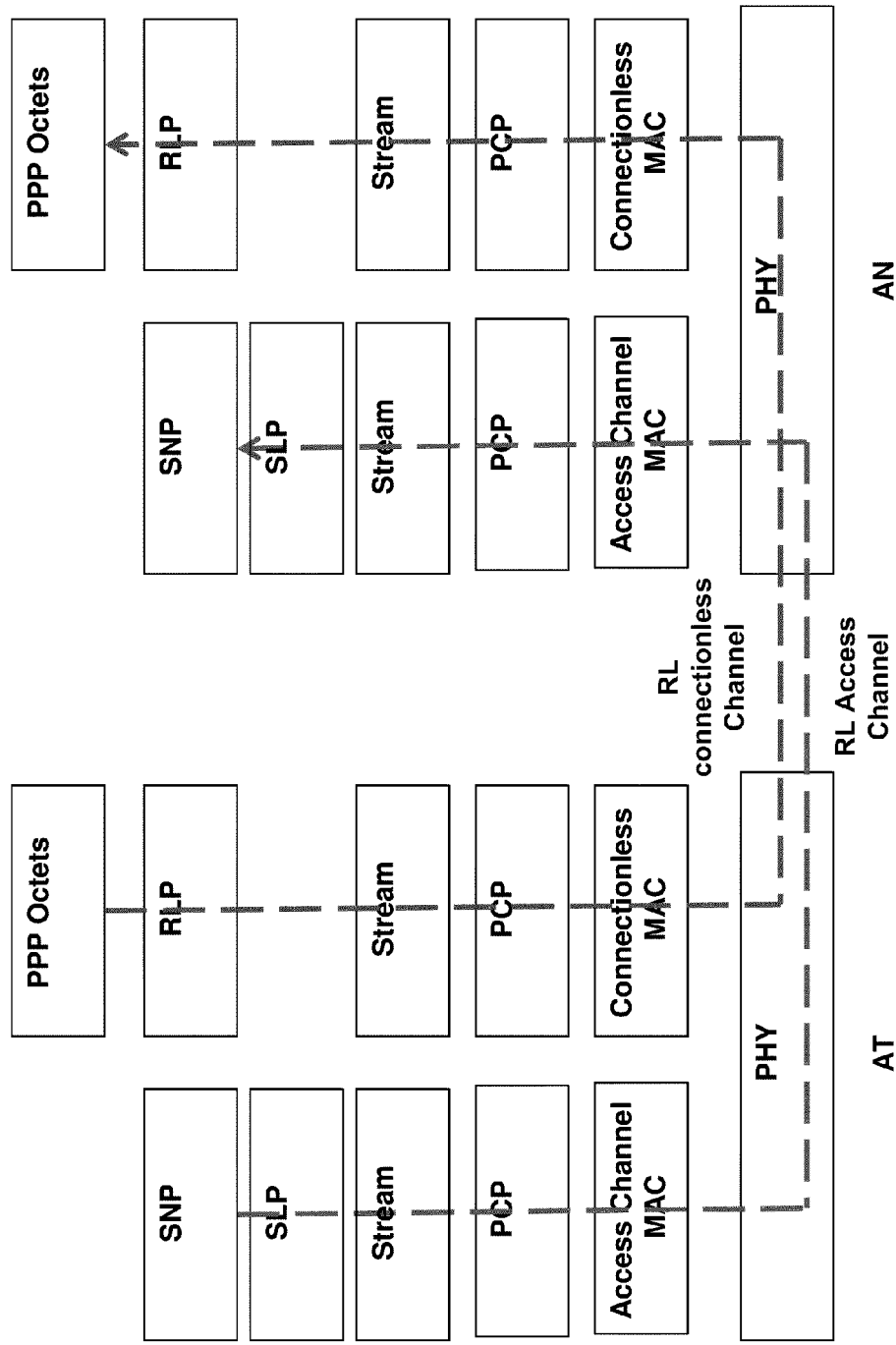
FIG. 19 shows an example of a RL connectionless channel data path and a RL access channel path, where SNP is the signaling network protocol, RLP is the radio link protocol, SLP is the signaling link protocol, PCP is the pracket consolidation procotol and PPP is the point to point protocol.

FIG. 19 shows an example of a RL connectionless channel data path and a RL access channel path, where SNP is the signaling network protocol, RLP is the radio link protocol, SLP is the signaling link protocol, PCP is the pracket consolidation procotol and PPP is the point to point protocol. The RL connectionless channel from the access channels are represented by dashed lines with arrows.

In order to reduce the RL data transmission congestion on the signaling channel, it would be necessary to separate the RL connectionless channel from the access channel. There are a couple of ways to separate them. (1) A simple implementation is to configure the connectionless channel with different public long code mask from the access channel long code mask. When the mobile station needs to transmit data, it could use the connectionless channel. If the mobile station needs to send the signaling, it could use access channel. (2) If the RL connectionless channel and access channel have to share the public long code mask, the radio network may be provisioned to separate the connectionless channel from access channel via using different PN randomization delay value. For example, the traditional access channel would use default PN randomization value (0), while the connectionless channel might use the other values. (3) Some implementation may use one bit in Access MAC header to indicate the packet type, either signaling or data. If the mobile station is going to send signaling, it could send this bit to "0". Otherwise, it sets to "1".

Figure 20:
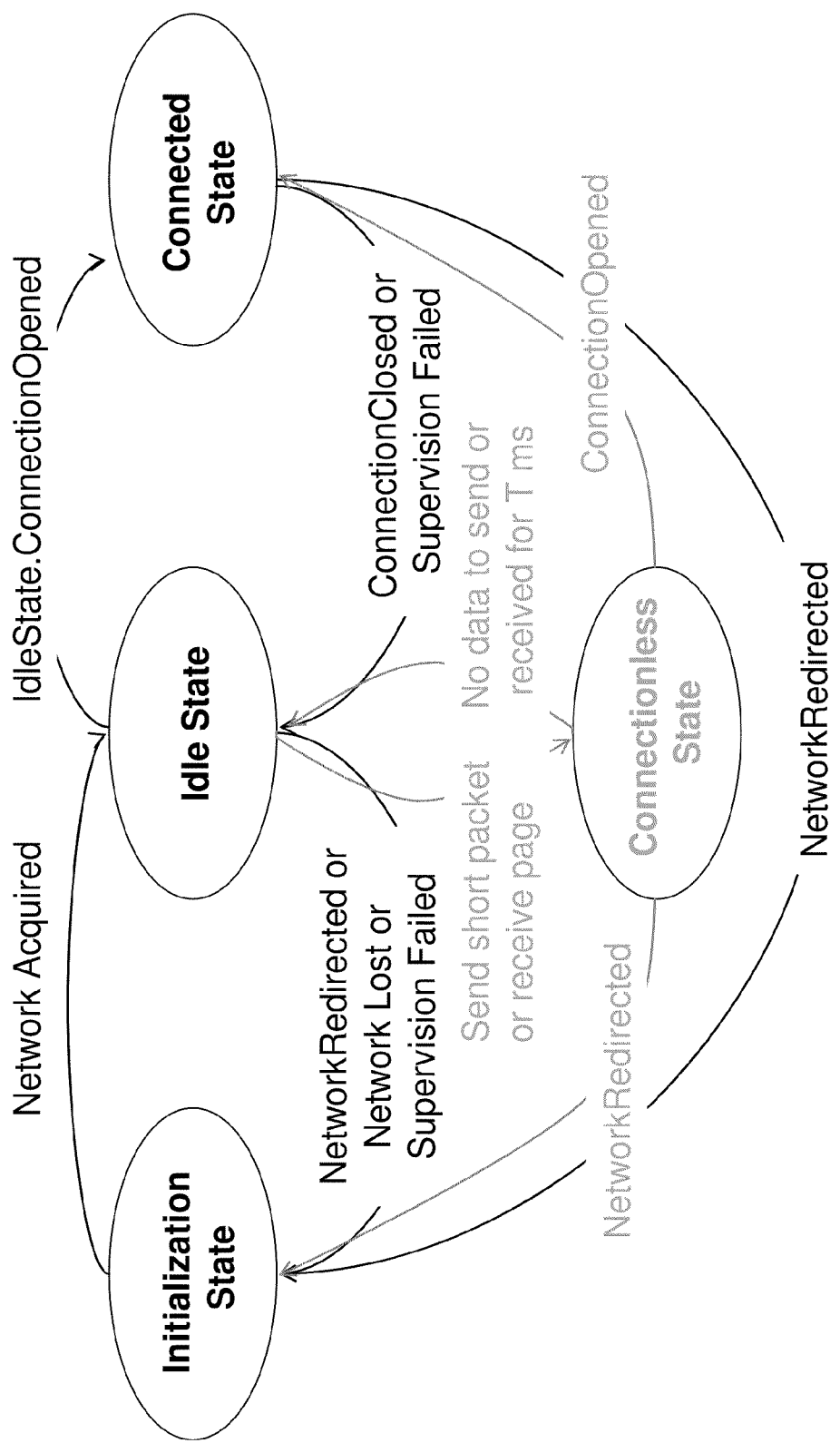
FIGS. 20 and 21 illustrate state transitions at the mobile station and the radio access network under an Air Link Management Protocol (ALMP), respectively.
Figure 21:
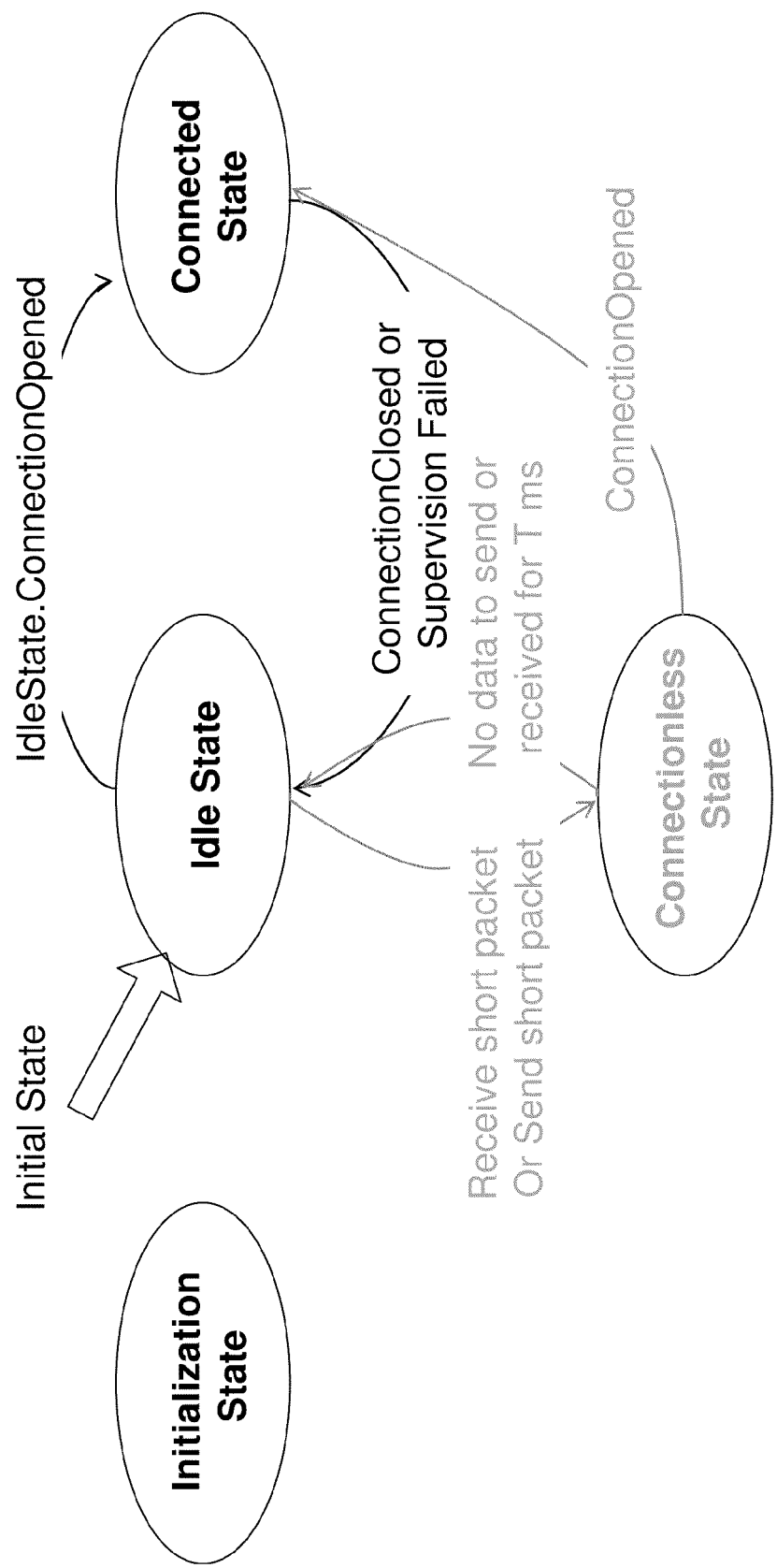

FIGS. 20 and 21 illustrate state transitions at the mobile station and the radio network under the ALMP, respectively. In one implementation, either mobile station or radion network can determine whether to use connection oriented or connectionless to transmit the packets. Normally the connection oriented transmission is used for large size packet transmission, while connectionless is used for the small size packet transmission. At the mobile station side, if the size of data packets to be transmitted is over a threshold, the mobile station can set up a connection oriented transmission. Otherwise, the mobile station could enter the connectionless state autonomously and send the data via a connectionless channel. At the radio network side, if the size of data packets to be transmitted is over a threshold, the radio network can send a page message to the mobile station to set up a connection oriented transmission, and then transmit the data over the traffic channel. Otherwise, the radio network can send a page message with Connectionless Transmission Indication (or other request message) to trigger the mobile station to enter the Connectionless State first, and subsequently, the radio network can transmit the data over a FL connectionless channel after it receives the state transit confirmation from the mobile station.

FIG. 20 shows the transition from the Idle State to the Connectionless State for the mobile station in CDMA2000 HRPD. If mobile station has short burst data to send, it can go to Connectionless State autonomously, and get a RL Connectionless Channel for transmission. If mobile station receives a Page (or a Request) message indicating the radio network is going to send short burst data, the mobile station will enter Connectionless State, respond the state transit and listen to FL Connectionless Channel. For the transition from the Connectionless State to Idle State, if the mobile station does not have data to send or no data received for T (ms) time, it will go back to Idle State and perform normal sleep and wakeup. For the transition from the Connectionless State to Connected State, if the mobile station has a large amount of data to transmit, it can send a Connection Request message and transit to Connected State after the connection is Opened. For the transition from the Connectionless State to Initialization State, if to mobile station receives a Network Redirection message, it will go to Initialization State.

FIG. 21 shows state transitions of the radio network under the ALMP. For the transition from the Idle State to the Connectionless State, if radio network receives a short burst data for a mobile station, it will enter the Connectionless state autonomously. If the radio network has a short burst data to send, it can first send a Page (or other Request) message with Connectionless Transmission Indication to indicate a short burst data is coming from Connectionless Channel. Next, the radio network can go to Connectionless State to send FL packets after receiving the state transit confirmation from AT. For the transition from the Connectionless State to Idle State, if the radio network does not receive data from mobile station or has not data to send for T (ms) time, it will go back to Idle State. For the transition from the Connectionless State to Connected State, if radio network receives a ConnectionRequest message, it will enter ConnectionOpened state, and, if the radio network has a large amount of data to transmit, it can send a Page (or Request) message to request a connection and transit to Connected State after the connection is Opened.

With respect to the connectionless channel configuration, the mobile station can indicate its capability of supporting the connectionless transmission in the configuration negotiation and the radio network can broadcast the capability of supporting connectionless transmission in either modified sector parameter message or a new overhead message. In one implementation, the radio network can provide attributes to mobile station to configure the Connectionless MAC channels. As an example, the attributes of the RL connectionless channels can include number of RL connectionless channels (e.g., the number of RL connectionless channels in the closed loop power control (CLPC) mode and the number of RL connectionless channels in open loop power control (OLPC) mode), the Initial Configuration Attributes (e.g., Probe sequence max, probe backoff, etc), Long Code Mask Parameters Attributes, Pilot Parameters Attributes, Data Channel Power Parameters Attributes, Rate Parameters Attributes and RRI Power Parameters Attribute. In addition, the radio network can provide attributes of FL connectionless channels, such as the number of FL connectionless channels which is the same as the number of RL connectionless channels in CLPC mode, MAC Index Parameters Attributes, RL-FL Connectionless Channels Mapping Attributes (e.g., mapping the public long code mask of RL connectionless channel in CLPC mode to the shared public MAC Index of FL connectionless channel) and other Attributes.

In some implementations, a wireless communication system can be configured to include an Air Link Management Protocol (ALMP) to control one or more connectionless channels and can operate a connectionless channel based on a connectionless channel configuration information. The Connectionless State in ALMP is used to distinguish the connection oriented state in ALMP protocol and provides a way for ALMP to manage the connectionless transmission so that ALMP can provide smooth transits between the connectionless and connection oriented modes. All the ATs in the Connectionless State share the FL and RL connectionless channels to receive or transmit short burst packets. A Connectionless Channel uses Access Terminal Identifier record (ATI record) in the MAC Header to identify the access terminal. The AT can send the short burst data over the RL connectionless channel. AT RL MAC can send data over the Connectionless Data channel. AT RL MAC needs to send RRI with data to indicate RL transmit rate if using variable rate transmission. AT FL MAC needs to monitor RPC and follows the power control command when transmitting data over RL connectionless channel using CLPC mode. AT FL MAC may need to demodulate and decode FL packets over the FL Connectionless Channel using the fixed rate. On the network side, the AN can send the short burst data over FL connectionless channel. AN FL MAC needs to transmit FL packets using fixed rate. And to monitor the RL connectionless channels. AN RL MAC may need to demodulate and decode RRI. The AN RL MAC may need to demodulate and decode RL packets over the RL connectionless channel according to RRI or fixed rate. AN FL MAC needs to send RPC to AT to perform Closed Loop Power Control when the RL connectionless channel is configured as CLPC mode.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communications, comprising:
   monitoring, at a first base station, for an access probe sent from a wireless device, a single transmission of the access probe from the wireless device generating multipath signals at the first base station, wherein the monitoring includes:
      receiving, at the first base station, over a first wireless communication channel, a preamble pilot in the access probe from the wireless device, wherein the first wireless communication channel is a reverse link connectionless oriented wireless channel for unscheduled pilot information from multiple wireless devices;
      receiving, at the first base station, over a second wireless communication channel, a data packet in the access probe corresponding to the preamble pilot from the wireless device, wherein the second wireless communication channel is a reverse link connectionless oriented wireless channel for unscheduled user data from the multiple wireless devices;

receiving, at the first base station, over a third wireless communication channel, a rate indication in the access probe from the wireless device, wherein the third wireless communication channel is a reverse link connectionless oriented wireless channel for unscheduled assistant information from the multiple wireless device, and wherein the rate indication indicates a data transmission rate for the data packet, the data transmission rate determined by the wireless device; and decoding, by the first base station, the data packet based on the preamble pilot and the data transmission rated indicated by the rate indication;

extracting a base station identifier from the access probe, wherein the base station identifier included in the access probe is provided in a form of a serving sector pseudo-noise (PN) code to identify a serving base station that is serving the wireless device on a forward link;

operating the first base station, when the extracted serving sector PN code in the base station identifier corresponds to a pilot PN code of the first base station, to transmit an acknowledgement to the wireless device; and operating the first base station, when the extracted base station identifier identifies a second base station, to pass received information to the second base station, thereby allowing a forward link serving sector of the wireless device served from the second base station to the wireless device to be separated from a reverse link serving sector of the wireless device served from the wireless device to the first base station, wherein the method for wireless communication further comprises:

operating the first base station, upon determining that a base station in a different sector of a same cell also receives the access probe, to combine the multi-path signals received within a predetermined time window from the earliest receipt of multi-path signals and not to combine the multi-path signals received beyond the predetermined time window, and operating the first base station, upon determining that the base station in a different cell also receives the access probe, to forward the multi-path signals to a base station controller (BSC).

2. The method of claim 1, further comprising:
operating wireless devices to transmit access probes based on a randomized value and a minimum delay unit.

3. The method of claim 2, wherein the multi-path signals received within the predetermined time window is considered as signals from the wireless device and the multi-path signals received beyond the predetermined time window is considered as signals from a different wireless device.

4. The method of claim 1, further comprising:
assigning a long code mask to the plurality of reverse link connectionless oriented wireless channels; and
operating two or more base stations to monitor for access probes based on the long code mask.

5. The method of claim 1, further comprising:
operating a monitoring and control network to manage one or more wireless sensor networks; and
operating the wireless device to transmit data from a sensor network over the reverse link connectionless oriented wireless channel.

6. A method for wireless communications, comprising:
selecting a base station that is serving a wireless device on a forward link based on radio signals received from two or more base stations, wherein the selected base station is different from a second base station for a reverse link for the wireless device;

sending an access probe included in a sequence of predetermined number of access probes that includes a base station identifier provided in a form of a serving sector pseudo-noise (PN) code that corresponds to a pilot PN code of the selected base station, wherein sending the access probe comprises:

sending, to the second base station, a preamble pilot in the access probe over a first wireless communication channel, wherein the first wireless communication channel is a reverse link connectionless oriented wireless channel for unscheduled pilot information from the wireless device to the second base station;

sending, to the second base station, a data packet corresponding to the preamble pilot over a second wireless communication channel, wherein the second wireless communication channel is a reverse link connectionless oriented wireless channel for unscheduled user data from the wireless device; and sending, to the second base station, a rate indication over a third wireless communication channel, wherein the third wireless communication channel is a reverse link connectionless oriented wireless channel for unscheduled assistant information from the wireless device, and wherein the rate indication indicates a data transmission rate for the data packet, the data transmission rate determined by the wireless device;

monitoring for an acknowledgment of a reception of the access probe sent by a forward link channel from the selected base station to the wireless device, wherein the wireless communication channel is established from the wireless device to the second base station and not to the first base station, continuing sending, after waiting for a predetermined back-off time duration without receiving the acknowledgement of the reception of the access probe, remaining access probes included in the sequence of predetermined number of access probes over the first, second, and third wireless communication channels; and stopping probe transmission upon receiving the acknowledgement of the reception of the access probe.

7. The method of claim 6, wherein sending the access probe comprises: using a randomized value and a minimum delay unit to determine a time to transmit the access probe.

8. The method of claim 6, further comprising:
transmitting a plurality of user data packets over the connectionless oriented wireless channel using a plurality of different transmission rates.

9. The method of claim 6, wherein the sending an access probe includes:
transmitting the access probe including preamble slots and capsule slots, wherein a first pilot signal is transmitted in the preamble slots and a second pilot signal is transmitted in the capsule slots.

10. The method of claim 9, wherein a length of the capsule slot depends on a user data packet being transmitted.

11. The method of claim 10, wherein transmission power of the capsule slot is controlled selectively using a closed loop transmission depending on the length of the capsule slot.

12. The method of claim 6, wherein the access probe is sent using a first transmission power, and the remaining access probes are sent using increasing transmission powers with a last access probe transmitted using a second transmission power.

13. The method of claim 12, comprising:
determining a third transmission power for a second sequence of predetermined number of access probes based on a difference between the second transmission power and the first transmission power.

14. A method for wireless communications, comprising:
providing a reverse link comprising a plurality of connectionless oriented wireless channels and a connection oriented wireless channel, wherein the plurality of connectionless oriented wireless channels includes a first reverse link connectionless oriented wireless channel for unscheduled pilot information from wireless devices, a second reverse link connectionless oriented wireless channel for unscheduled user data communications from the wireless devices, and a third reverse link connectionless oriented wireless channel for unscheduled assistant data from the wireless devices to indicate a data transmission rate for each of the wireless devices; and
operating base stations to communicate with wireless devices that use the plurality of reverse link connectionless oriented wireless channels thereby allowing wireless devices to simultaneously use the reverse link connectionless oriented wireless channel and the connection oriented wireless channel to transmit user data associated with a data application,
wherein the operating of the base stations further includes:
operating the base stations to monitor for an access probe from a wireless device, wherein the access probe includes a base station identifier provided in a form of a serving sector pseudo-noise (PN) code to identify a serving base station that is serving the wireless device on a forward link, wherein monitoring the access probe includes:
  operating the base stations to receive a preamble pilot from the wireless device over a first reverse link connectionless oriented wireless channel;
  operating the base stations to receive a data packet corresponding to the preamble pilot from the wireless device over the second reverse link connectionless oriented wireless channel;
  operating the base stations to receive a rate indication from the wireless device over the third reverse link connectionless oriented wireless channel, wherein the rate indication indicates a data transmission rate for the data packet, the data transmission rate determined by the wireless device; and
  operating the base stations to decode the data packet based on the preamble pilot and the data transmission rate indicated by the rate indication;
measuring a signal to interference and noise ratio for the plurality of reverse link connectionless oriented wireless channels based on the decoded data packet and comparing the measurement with a predetermined setting point; and
providing, based on the comparison, individual power control information to the plurality of connectionless oriented wireless channels of the reverse link using a connectionless reverse power control (RPC) channel defined in a forward link connectionless oriented wireless channel, wherein the connectionless RPC channel is associated with the plurality of reverse link connectionless oriented wireless channels and is shared by the wireless devices communicating over the plurality of connectionless oriented wireless channels.

15. The method of claim 14, further comprising:
assigning a long code mask to the plurality of reverse link connectionless oriented wireless channels; and
wherein the operating of the base stations to monitor for the access probe from the wireless device includes operating the base stations to monitor for the access probe from the wireless device based on the long code mask.

16. A system for wireless communications, comprising:
base stations configured to communicate with wireless devices over a reverse link comprising a plurality of connectionless oriented wireless channels and a connection oriented wireless channel, wherein the plurality of connectionless oriented wireless channels includes a first reverse link connectionless oriented wireless channel for unscheduled pilot information from the wireless devices, a second reverse link connectionless oriented wireless channel for unscheduled user data communications from the wireless devices, and a third reverse link connectionless oriented wireless channel for unscheduled assistant data from the wireless devices to indicate a data transmission rate for each of the wireless devices, and wherein the connection oriented transmission channel is allocated for scheduled user data communications from wireless devices,
wherein the base stations are further operable to (1) monitor for an access probe from a wireless device, the access probe including a base station identifier provided in a form of a serving sector pseudo-noise (PN) code to identify a serving base station that is serving the wireless device on a forward link, (2) measure a signal to interference and noise ratio for the plurality of reverse link connectionless oriented wireless channels and compare the measurement with a predetermined setting point; and (3) provide, based on the comparison, individual power control information to the plurality of connectionless oriented wireless channels of the reverse link using a connectionless reverse power control (RPC) channel defined in a forward link connectionless oriented wireless channel, wherein the connectionless RPC channel is associated with the plurality of reverse link connectionless oriented wireless channels and is shared by the wireless devices communicating over the plurality of connectionless oriented wireless channels, and
wherein monitoring for the access probe includes:
  receiving a pilot preamble from the wireless device over a first reverse link connectionless oriented wireless channel,
  receiving a data packet corresponding to the access probe from the wireless device over a second reverse link connectionless oriented wireless channel,
  receiving a rate indication from the wireless device over the third reverse link connectionless oriented wireless channel, wherein the rate indication indicates a data transmission rate for the data packet, the data transmission rated determined by the wireless device, and
  decoding the data packet based on the access probe and the data transmission rate indicated by the rate indication.

17. A method for wireless communications, comprising:
monitoring multiple reverse link wireless channels to receive user data from one or more wireless devices, the multiple reverse link wireless channels comprising a plurality of connectionless oriented wireless channels and a connection oriented wireless channel, wherein the reverse link connection oriented wireless channel is associated with scheduled communications from the one or more wireless devices and the plurality of reverse link connectionless oriented wireless channels includes a first reverse link connectionless oriented wireless channel associated with unscheduled pilot information from the one or more wireless devices, a second reverse link connectionless oriented wireless channel associated with unscheduled user data from the one or more wireless devices, and a third reverse link connectionless oriented wireless channel associated with unscheduled assistant data from the one or more wireless devices to indicate a transmission rate for each of the one or more wireless devices, wherein data from a data application is simultaneously received over the second reverse link connectionless oriented wireless channel and the reverse link connection oriented wireless channel; and transmitting user data over one or more forward link wireless channels to the one or more wireless devices, the forward link wireless channels including a forward link connection oriented wireless channel associated with scheduled communications to the one or more wireless devices and a forward link connectionless oriented wireless channel associated with unscheduled communications to the one or more wireless devices, wherein the plurality of reverse link connectionless oriented wireless channels is associated with one or more reverse power control channel defined in the forward link connectionless oriented wireless channel such that individual power control information is provided to the plurality of reverse link connectionless oriented wireless channels, each of the one or more reverse power control channel shared by the one or more wireless devices communicating over the plurality of reverse link connectionless oriented wireless channels, and wherein the monitoring of the plurality of connectionless oriented wireless channels includes monitoring an access probe from a wireless device of the one or more wireless device, the access probe including a base station identifier provided in a form of a serving sector pseudo-noise (PN) code to identify a serving base station that is serving the wireless device on each the one or more forward links, and wherein the monitoring of the access probe includes:
receiving a preamble pilot from the wireless device over the first reverse link connectionless oriented wireless channel,
receiving a data packet corresponding to the preamble pilot from the wireless device over a second reverse link connectionless oriented wireless channel,
receiving a rate indication from the wireless device over the third reverse link connectionless oriented wireless channel, wherein the rate indication indicates a data transmission rate for the data packet, the data transmission rated determined by the wireless device,
decoding the data packet based on the access probe and the data transmission rate indicated by the rate indication, and
measuring a signal to interference and noise ratio for the plurality of reverse link connectionless oriented wireless channels based on the decoded data packet for providing the individual power control information.

18. The method of claim 17, further comprising:
transmitting power control information on the forward link connectionless oriented wireless channel to control a transmission power output of a wireless device on the reverse link connectionless oriented wireless channel.

* * * * *